US012695790B2

(12) United States Patent　　　　(10) Patent No.:　US 12,695,790 B2
　　　Crabtree et al.　　　　　　　　(45) Date of Patent:　　　Jul. 28, 2026

(54) PLATFORM FOR MANAGEMENT AND TRACKING OF COLLABORATIVE PROJECTS

(71) Applicant: QOMPLX LLC, Reston, VA (US)

(72) Inventors: Jason Crabtree, Vienna, VA (US); Andrew Sellers, Monument, CO (US)

(73) Assignee: QOMPLX LLC, Reston, VA (US)

( * ) Notice:　Subject to any disclaimer, the term of this patent is extended or adjusted under 35 U.S.C. 154(b) by 134 days.

(21) Appl. No.: 18/597,875

(22) Filed:　Mar. 6, 2024

(65)　　　　　Prior Publication Data

US 2024/0214428 A1　Jun. 27, 2024

Related U.S. Application Data

(63) Continuation of application No. 17/189,161, filed on Mar. 1, 2021, which is a continuation-in-part of application No. 17/061,195, filed on Oct. 1, 2020, now Pat. No. 11,570,214, which is a continuation-in-part of application No. 17/035,029, filed on Sep. 28, 2020, now Pat. No. 11,546,380, which is a continuation-in-part of application No. 17/008,276, filed on Aug. 31, 2020, now Pat. No. 11,323,484, which is a continuation-in-part of application No. 17/000,504, filed on Aug. 24, 2020, now Pat. No. 11,477,245, which is a (Continued)

(51) Int. Cl.
　　*H04L 9/40*　　　　(2022.01)
　　*G06F 9/48*　　　　(2006.01)
　　*G06F 9/50*　　　　(2006.01)

*G06F 16/2458*　　(2019.01)
　　*G06F 16/951*　　　(2019.01)

(52) U.S. Cl.
　　CPC ........... *H04L 63/20* (2013.01); *G06F 9/5038* (2013.01); *G06F 16/2477* (2019.01); *G06F 16/951* (2019.01); *H04L 63/1425* (2013.01); *H04L 63/1441* (2013.01); *G06F 9/4881* (2013.01)

(58) Field of Classification Search
　　CPC . H04L 63/20; H04L 63/1425; H04L 63/1441; G06F 16/2477; G06F 16/951; G06F 9/5038; G06F 9/4881
　　See application file for complete search history.

(56)　　　　　References Cited

U.S. PATENT DOCUMENTS 7,818,224 B2　10/2010　Boerner
7,818,417 B2　10/2010　Ginis et al.
　　　　　　(Continued)

FOREIGN PATENT DOCUMENTS

WO　　　　　0163534 A2　　8/2001
WO　　　2015094545 A1　　6/2015

*Primary Examiner* — Yonas A Bayou
(74) *Attorney, Agent, or Firm* — NK Patent Law

(57)　　　　　　ABSTRACT

Management and tracking of collaborative projects using a logging service configured to track contributions of a plurality of participants of a monitored project and log the contributions in a graph and timeseries-based contributions dataset. A knowledge graph generator generates a timeseries-based knowledge graph from gathered information. An automated planning service determines an associated value of the monitored project and a remuneration service analyzes the contributions dataset to determine appropriate apportionment of remuneration.

32 Claims, 14 Drawing Sheets

Related U.S. Application Data continuation-in-part of application No. 16/855,724, filed on Apr. 22, 2020, now Pat. No. 11,218,510, which is a continuation-in-part of application No. 16/836,717, filed on Mar. 31, 2020, now Pat. No. 10,917,428, which is a continuation-in-part of application No. 15/887,496, filed on Feb. 2, 2018, now Pat. No. 10,783,241, which is a continuation-in-part of application No. 15/823,285, filed on Nov. 27, 2017, now Pat. No. 10,740,096, which is a continuation-in-part of application No. 15/788,718, filed on Oct. 19, 2017, now Pat. No. 10,861,014, which is a continuation-in-part of application No. 15/788,002, filed on Oct. 19, 2017, now abandoned, which is a continuation-in-part of application No. 15/787,601, filed on Oct. 18, 2017, now Pat. No. 10,860,660, which is a continuation-in-part of application No. 15/616,427, filed on Jun. 7, 2017, now abandoned, which is a continuation-in-part of application No. 14/925,974, filed on Oct. 28, 2015, now abandoned, said application No. 15/887,496 is a continuation-in-part of application No. 15/818,733, filed on Nov. 20, 2017, now Pat. No. 10,673,887, which is a continuation-in-part of application No. 15/725,274, filed on Oct. 4, 2017, now Pat. No. 10,609,079, which is a continuation-in-part of application No. 15/655,113, filed on Jul. 20, 2017, now Pat. No. 10,735,456, which is a continuation-in-part of application No. 15/616,427, filed on Jun. 7, 2017, now abandoned, and a continuation-in-part of application No. 15/237,625, filed on Aug. 15, 2016, now Pat. No. 10,248,910, which is a continuation-in-part of application No. 15/206,195, filed on Jul. 8, 2016, now abandoned, which is a continuation-in-part of application No. 15/186,453, filed on Jun. 18, 2016, now abandoned, which is a continuation-in-part of application No. 15/166,158, filed on May 26, 2016, now abandoned, which is a continuation-in-part of application No. 15/141,752, filed on Apr. 28, 2016, now Pat. No. 10,860,962, which is a continuation-in-part of application No. 15/091,563, filed on Apr. 5, 2016, now Pat. No. 10,204,147, and a continuation-in-part of application No. 14/986,536, filed on Dec. 31, 2015, now Pat. No. 10,210,255, and a continuation-in-part of application No. 14/925,974, filed on Oct. 28, 2015, now abandoned, which is a continuation-in-part of application No. 16/777,270, filed on Jan. 30, 2020, now Pat. No. 11,025,674, which is a continuation-in-part of application No. 16/720,383, filed on Dec. 19, 2019, now Pat. No. 10,944,795, which is a continuation of application No. 15/823,363, filed on Nov. 27, 2017, now Pat. No. 10,560,483, which is a continuation-in-part of application No. 15/725,274, filed on Oct. 4, 2017, now Pat. No. 10,609,079, said application No. 17/000,504 is a continuation-in-part of application No. 16/412,340, filed on May 14, 2019, now Pat. No. 11,539,663, which is a continuation-in-part of application No. 16/267,893, filed on Feb. 5, 2019, now abandoned, which is a continuation-in-part of application No. 16/248,133, filed on Jan. 15, 2019, now abandoned, which is a continuation-in-part of application No. 15/849,901, filed on Dec. 21, 2017, now Pat. No. 11,023,284, which is a continuation-in-part of application No. 15/835,436, filed on Dec. 7, 2017, now Pat. No. 10,572,828, which is a continuation-in-part of application No. 15/790,457, filed on Oct. 23, 2017, now Pat. No. 10,884,999, which is a continuation-in-part of application No. 15/790,327, filed on Oct. 23, 2017, now Pat. No. 10,860,951, which is a continuation-in-part of application No. 15/616,427, filed on Jun. 7, 2017, now abandoned, said application No. 15/790,327 is a continuation-in-part of application No. 15/141,752, filed on Apr. 28, 2016, now Pat. No. 10,860,962, said application No. 15/849,901 is a continuation-in-part of application No. 15/835,312, filed on Dec. 7, 2017, now Pat. No. 11,055,451, which is a continuation-in-part of application No. 15/186,453, filed on Jun. 18, 2016, now abandoned, said application No. 16/248,133 is a continuation-in-part of application No. 15/813,097, filed on Nov. 14, 2017, now abandoned, which is a continuation-in-part of application No. 15/616,427, filed on Jun. 7, 2017, now abandoned, said application No. 16/248,133 is a continuation-in-part of application No. 15/806,697, filed on Nov. 8, 2017, now abandoned, which is a continuation-in-part of application No. 15/376,657, filed on Dec. 13, 2016, now Pat. No. 10,402,906, which is a continuation-in-part of application No. 15/237,625, filed on Aug. 15, 2016, now Pat. No. 10,248,910, said application No. 15/806,697 is a continuation-in-part of application No. 15/343,209, filed on Nov. 4, 2016, now Pat. No. 11,087,403, which is a continuation-in-part of application No. 15/237,625, filed on Aug. 15, 2016, now Pat. No. 10,248,910, and a continuation-in-part of application No. 15/229,476, filed on Aug. 5, 2016, now Pat. No. 10,454,791, which is a continuation-in-part of application No. 15/206,195, filed on Jul. 8, 2016, now abandoned, said application No. 16/248,133 is a continuation-in-part of application No. 15/673,368, filed on Aug. 9, 2017, now abandoned, which is a continuation-in-part of application No. 15/376,657, filed on Dec. 13, 2016, now Pat. No. 10,402,906, said application No. 17/061,195 is a continuation-in-part of application No. 15/879,801, filed on Jan. 25, 2018, now abandoned, which is a continuation-in-part of application No. 15/379,899, filed on Dec. 15, 2016, now abandoned, which is a continuation-in-part of application No. 15/376,657, filed on Dec. 13, 2016, now Pat. No. 10,402,906, said application No. 17/189,161 is a continuation-in-part of application No. 16/709,598, filed on Dec. 10, 2019, now Pat. No. 11,507,858, which is a continuation-in-part of application No. 14/925,974, filed on Oct. 28, 2015, now abandoned.

(60) Provisional application No. 62/568,298, filed on Oct. 4, 2017, provisional application No. 62/568,312, filed on Oct. 4, 2017, provisional application No. 62/568,305, filed on Oct. 4, 2017, provisional application No. 62/568,291, filed on Oct. 4, 2017, provisional application No. 62/568,307, filed on Oct. 4, 2017.

(56)     References Cited

U.S. PATENT DOCUMENTS

| | | | |
|---|---|---|---|
| 7,840,677 | B2 | 11/2010 | Li et al. |
| 8,069,190 | B2 | 11/2011 | Mccoll et al. |
| 8,156,029 | B2 | 4/2012 | Szydlo et al. |
| 8,352,347 | B2 | 1/2013 | Thomas et al. |

(56)　　　　　References Cited

U.S. PATENT DOCUMENTS

| | | |
|---|---|---|
| 8,370,192 B2 | 2/2013 | Deo et al. |
| 9,338,061 B2 | 5/2016 | Chen et al. |
| 9,461,876 B2 | 10/2016 | Van Dusen et al. |
| 9,639,575 B2 | 5/2017 | Leida et al. |
| 9,721,086 B2 | 8/2017 | Shear et al. |
| 10,168,691 B2 | 1/2019 | Zornio et al. |
| 10,740,358 B2 | 8/2020 | Chan et al. |
| 2005/0209993 A1 | 9/2005 | Koehler |
| 2007/0168370 A1 | 7/2007 | Hardy |
| 2007/0174233 A1 | 7/2007 | Ginis et al. |
| 2009/0171999 A1 | 7/2009 | Mccoll et al. |
| 2009/0235251 A1 | 9/2009 | Li et al. |
| 2010/0076803 A1* | 3/2010 | Deo ................. G06Q 10/06311 |
| | | 707/E17.044 |
| 2013/0262443 A1 | 10/2013 | Leida et al. |
| 2013/0290554 A1 | 10/2013 | Chen et al. |
| 2014/0075004 A1* | 3/2014 | Van Dusen ............ G06Q 10/10 |
| | | 709/223 |
| 2014/0280952 A1 | 9/2014 | Shear et al. |
| 2014/0351827 A1* | 11/2014 | Llamas ................. G06F 9/4881 |
| | | 718/107 |
| 2015/0033305 A1* | 1/2015 | Shear .................. G06F 21/6245 |
| | | 726/11 |
| 2015/0254330 A1 | 9/2015 | Chan et al. |
| 2016/0092557 A1 | 3/2016 | Stojanovic et al. |
| 2016/0098037 A1 | 4/2016 | Zornio et al. |
| 2016/0358102 A1 | 12/2016 | Bowers et al. |
| 2017/0006135 A1 | 1/2017 | Siebel et al. |
| 2017/0090893 A1 | 3/2017 | Aditya et al. |
| 2019/0155646 A1 | 5/2019 | Bishop et al. |
| 2019/0163533 A1* | 5/2019 | Andrews .............. G06F 9/5066 |
| 2023/0208882 A1* | 6/2023 | Crabtree ............ H04L 63/1408 |
| | | 726/22 |
| 2024/0171614 A1* | 5/2024 | Crabtree .............. G06F 16/951 |

* cited by examiner

Monitor and track resources associated with a particular
software application
803

Log contributions and progress of efforts for fixing a
particular bug
806

Determine value of contribution
809

Renumeration distributed based on logged contributions
and associated value
812

800

Generate graphs for involved components
901

Track user activity and contributions as graph-timeseries data
902

Evaluate state changes in graph timeseries data to determine contributions and apportionment
903

Distribute remuneration based on data
904

900

PLATFORM FOR MANAGEMENT AND TRACKING OF COLLABORATIVE PROJECTS

CROSS-REFERENCE TO RELATED APPLICATIONS

Priority is claimed in the application data sheet to the following patents or patent applications, each of which is expressly incorporated herein by reference in its entirety:

Ser. No. 17/189,161
Ser. No. 17/061,195
Ser. No. 17/035,029
Ser. No. 17/008,276
Ser. No. 17/000,504
Ser. No. 16/855,724
Ser. No. 16/836,717
Ser. No. 15/887,496
Ser. No. 15/823,285
Ser. No. 15/788,718
Ser. No. 15/788,002
Ser. No. 15/787,601
62/568,312
Ser. No. 15/616,427
Ser. No. 14/925,974
62/568,305
62/568,307
Ser. No. 15/818,733
Ser. No. 15/725,274
Ser. No. 15/655,113
Ser. No. 15/237,625
Ser. No. 15/206,195
Ser. No. 15/186,453
Ser. No. 15/166,158
Ser. No. 15/141,752
Ser. No. 15/091,563
Ser. No. 14/986,536
Ser. No. 16/777,270
Ser. No. 16/720,383
Ser. No. 15/823,363
Ser. No. 16/412,340
Ser. No. 16/267,893
Ser. No. 16/248,133
Ser. No. 15/849,901
Ser. No. 15/835,436
Ser. No. 15/790,457
Ser. No. 15/790,327
62/568,291
62/568,298
Ser. No. 15/835,312
Ser. No. 15/813,097
Ser. No. 15/806,697
Ser. No. 15/376,657
Ser. No. 15/343,209
Ser. No. 15/229,476
Ser. No. 15/673,368
Ser. No. 15/879,801
Ser. No. 15/379,899
Ser. No. 16/709,598

BACKGROUND OF THE INVENTION

Field of the Invention

The disclosure relates to the field of automated tracking and management of collaborative projects.

Discussion of the State of the Art

The world is becoming increasing collaborative, and traditional organizations, which tend to be hierarchical in nature, are struggling in how to handle decision-making and innovate at scale. Currently collaborative efforts may be difficult to coordinate, especially if it is within a large company, and even more so if it requires significant resources of a company. Current approaches to match people of complimentary skillsets are too ad hoc, and not easily scalable, for example, connecting business experts with technologists who may possess the necessary abilities to execute a novel idea.

What is needed is a system that will allow a plurality of participants to easily and effectively collaborate, share and review new ideas, assemble required teams, and appropriate required resources or funding. Such a system should also be able to apportion remuneration to contributors.

SUMMARY OF THE INVENTION

Accordingly, the inventor has conceived, and reduced to practice, a platform for management and tracking of collaborative projects.

In a typical embodiment, a platform for management and tracking of collaborative projects is provided with a plurality of user-interface options for users to access the services provided by the platform. Services include a labor board for listing and browsing of resources, which may comprise people with various skillsets and qualifications, computation resources, physical resources, and the like; a proposal board for posting and review new ideas and proposals by peers; a mixed-reality environment of communications; a gaming environment; and a dashboard. Projects may also be offered, where contributors earn remuneration for their contributions.

In one aspect of the invention, a system for management and tracking of collaborative projects is provided, comprising a logging service comprising a memory, a processor, and a plurality of programming instructions stored in the memory thereof and operable on the processor thereof, wherein the programmable instructions, when operating on the processor, cause the processor to track contributions of a plurality of participants of a monitored project, and log the contributions in a graph and timeseries-based contributions dataset; a knowledge graph generator comprising a memory, a processor, and a plurality of programming instructions stored in the memory thereof and operable on the processor thereof, wherein the programmable instructions, when operating on the processor, cause the processor to gather information from a plurality of sources including at least a competitor and investment insight service, and generate a graph and timeseries-based knowledge graph from the gathered data; an automated planning service comprising a memory, a processor, and a plurality of programming instructions stored in the memory thereof and operable on the processor thereof, wherein the programmable instructions, when operating on the processor, cause the processor to determine an associated value of the monitored project by performing at least a plurality of graph analysis and transformations at least on economic value of the monitored project and the previously generated knowledge graph; and a remuneration service comprising a memory, a processor, and a plurality of programming instructions stored in the memory thereof and operable on the processor thereof, wherein the programmable instructions, when operating on the processor, cause the processor to analyze the contributions dataset by performing at least a plurality of graph calculations and transformations and timeseries analysis on the contributions dataset to determine appropriate apportionment of remuneration based at least on contributions of the participants and determined associated value.

In another embodiment of the invention the system further comprises a connector service comprising a memory, a processor, and a plurality of programming instructions stored in the memory thereof and operable on the processor thereof, wherein the programmable instructions, when operating on the processor, cause the processor to automatically allocate remuneration in the predetermined apportionment.

In another embodiment of the invention, the system further comprises a client access point comprising a connector service comprising a memory, a processor, and a plurality of programming instructions stored in the memory thereof and operable on the processor thereof, wherein the programmable instructions, when operating on the processor, cause the processor to provide a user with a plurality of interface options used for interacting with the system. In another embodiment of this aspect, the interface is a labor board for posting and browsing resources. In another embodiment of this aspect, the interface is a massively-multiplayer game, where a plurality of players is rewarded for solving in-game problems. In another embodiment of this aspect, the interface is a mixed-reality environment. In another embodiment of this aspect, the interface is a proposal board for posting proposals.

In another embodiment of this aspect, the automated planning service is further configured to autonomously create a new project based at least on a user-defined trigger event. In another embodiment of this aspect, the system further comprises a global tile service comprising a client access point comprising a connector service comprising a memory, a processor, and a plurality of programming instructions stored in the memory thereof and operable on the processor thereof, wherein the programmable instructions, when operating on the processor, cause the processor to perform geospatial timeseries tracking of contributions, and assets.

In another aspect of the invention, a method for management and tracking of collaborative projects is provided, comprising the steps of: (a) tracking contributions of a plurality of participants of a monitored project, using a logging service; (b) logging the contributions in a graph and timeseries-based contributions dataset, using the logging service; (c) gathering information from a plurality of sources including at least a competitor and investment insight service, using a knowledge graph generator; (d) generating a graph and timeseries-based knowledge graph from the gathered data, using the knowledge graph generator; (e) determining an associated value of the monitored project based at least on economic value of the monitored project by performing at least a plurality of graph analysis and transformations and the previously generated knowledge graph, using an automated planning service; and (f) analyzing the contributions dataset by performing at least a plurality of graph calculations and transformations and timeseries analysis on the contributions dataset to determine appropriate apportionment of remuneration based at least on contributions of the participants and determined associated value, using a remuneration service.

BRIEF DESCRIPTION OF THE DRAWING FIGURES

The accompanying drawings illustrate several aspects and, together with the description, serve to explain the principles of the invention according to the aspects. It will be appreciated by one skilled in the art that the particular arrangements illustrated in the drawings are merely exemplary, and are not to be considered as limiting of the scope of the invention or the claims herein in any way.

DETAILED DESCRIPTION OF THE INVENTION

Figure 1:
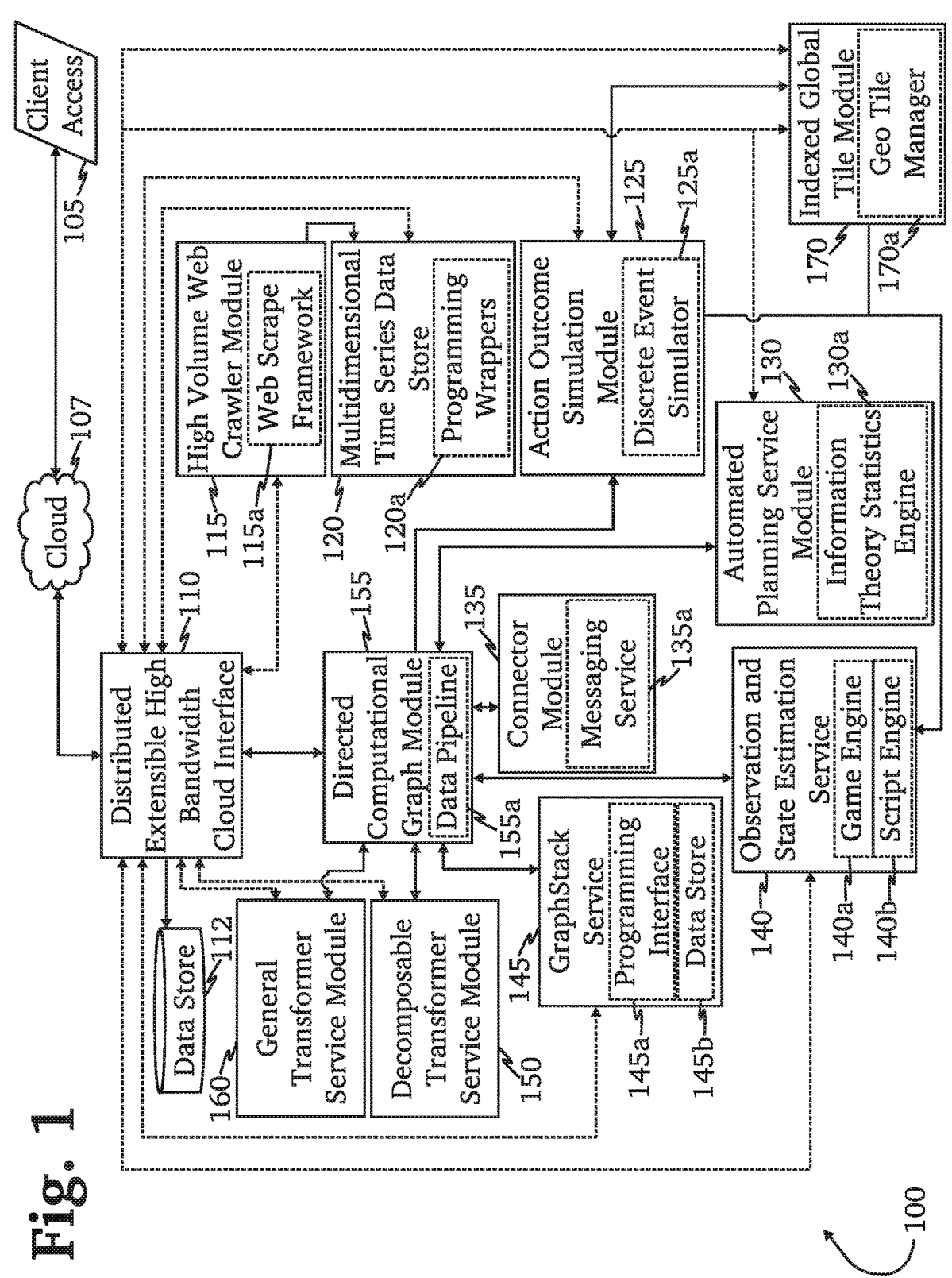
FIG. 1 is a diagram of an exemplary architecture of a business operating system according to an embodiment of the invention.

The inventor has conceived, and reduced to practice, a platform for management and tracking of collaborative projects.

One or more different aspects may be described in the present application. Further, for one or more of the aspects described herein, numerous alternative arrangements may be described; it should be appreciated that these are presented for illustrative purposes only and are not limiting of the aspects contained herein or the claims presented herein in any way. One or more of the arrangements may be widely applicable to numerous aspects, as may be readily apparent from the disclosure. In general, arrangements are described in sufficient detail to enable those skilled in the art to practice one or more of the aspects, and it should be appreciated that other arrangements may be utilized and that structural, logical, software, electrical and other changes may be made without departing from the scope of the particular aspects. Particular features of one or more of the aspects described herein may be described with reference to one or more particular aspects or figures that form a part of the present disclosure, and in which are shown, by way of illustration, specific arrangements of one or more of the aspects. It should be appreciated, however, that such features are not limited to usage in the one or more particular aspects or figures with reference to which they are described. The present disclosure is neither a literal description of all arrangements of one or more of the aspects nor a listing of features of one or more of the aspects that must be present in all arrangements.

Headings of sections provided in this patent application and the title of this patent application are for convenience only, and are not to be taken as limiting the disclosure in any way.

Devices that are in communication with each other need not be in continuous communication with each other, unless expressly specified otherwise. In addition, devices that are in communication with each other may communicate directly or indirectly through one or more communication means or intermediaries, logical or physical.

A description of an aspect with several components in communication with each other does not imply that all such components are required. To the contrary, a variety of optional components may be described to illustrate a wide variety of possible aspects and in order to more fully illustrate one or more aspects. Similarly, although process steps, method steps, algorithms or the like may be described in a sequential order, such processes, methods and algorithms may generally be configured to work in alternate orders, unless specifically stated to the contrary. In other words, any sequence or order of steps that may be described in this patent application does not, in and of itself, indicate a requirement that the steps be performed in that order. The steps of described processes may be performed in any order practical. Further, some steps may be performed simultaneously despite being described or implied as occurring non-simultaneously (e.g., because one step is described after the other step). Moreover, the illustration of a process by its depiction in a drawing does not imply that the illustrated process is exclusive of other variations and modifications thereto, does not imply that the illustrated process or any of its steps are necessary to one or more of the aspects, and does not imply that the illustrated process is preferred. Also, steps are generally described once per aspect, but this does not mean they must occur once, or that they may only occur once each time a process, method, or algorithm is carried out or executed. Some steps may be omitted in some aspects or some occurrences, or some steps may be executed more than once in a given aspect or occurrence.

When a single device or article is described herein, it will be readily apparent that more than one device or article may be used in place of a single device or article. Similarly, where more than one device or article is described herein, it will be readily apparent that a single device or article may be used in place of the more than one device or article.

The functionality or the features of a device may be alternatively embodied by one or more other devices that are not explicitly described as having such functionality or features. Thus, other aspects need not include the device itself.

Techniques and mechanisms described or referenced herein will sometimes be described in singular form for clarity. However, it should be appreciated that particular aspects may include multiple iterations of a technique or multiple instantiations of a mechanism unless noted otherwise. Process descriptions or blocks in figures should be understood as representing modules, segments, or portions of code which include one or more executable instructions for implementing specific logical functions or steps in the process. Alternate implementations are included within the scope of various aspects in which, for example, functions may be executed out of order from that shown or discussed, including substantially concurrently or in reverse order, depending on the functionality involved, as would be understood by those having ordinary skill in the art.

Conceptual Architecture

FIG. 1 is a diagram of an exemplary architecture of a business operating system 100 according to an embodiment of the invention. Client access to system 105 for specific data entry, system control and for interaction with system output such as automated predictive decision making and planning and alternate pathway simulations, occurs through the system's distributed, extensible high bandwidth cloud interface 110 which uses a versatile, robust web application driven interface for both input and display of client-facing information and a data store 112 such as, but not limited to MONGODB™, COUCHDB™, CASSANDRA™ or REDIS™ depending on the embodiment. Much of the business data analyzed by the system both from sources within the confines of the client business, and from cloud based sources 107, public or proprietary such as, but not limited to: subscribed business field specific data services, external remote sensors, subscribed satellite image and data feeds and web sites of interest to business operations both general and field specific, also enter the system through the cloud interface 110, data being passed to the connector module 135 which may possess the API routines 135a needed to accept and convert the external data and then pass the normalized information to other analysis and transformation components of the system, the directed computational graph module 155, high volume web crawler module 115, multidimensional time series database 120 and a graph stack service 145. Directed computational graph module 155 retrieves one or more streams of data from a plurality of sources, which includes, but is not limited to, a plurality of physical sensors, network service providers, web based questionnaires and surveys, monitoring of electronic infrastructure, crowd sourcing campaigns, and human input device information. Within directed computational graph module 155, data may be split into two identical streams in a specialized pre-programmed data pipeline 155a, wherein one sub-stream may be sent for batch processing and storage while the other sub-stream may be reformatted for transformation pipeline analysis. The data may be then transferred to a general transformer service module 160 for linear data transformation as part of analysis or the decomposable transformer service module 150 for branching or iterative transformations that are part of analysis. Directed computational graph module 155 represents all data as directed graphs where the transformations are nodes and the result messages between transformations edges of the graph. High-volume web crawling module 115 may use multiple server hosted preprogrammed web spiders which, while autonomously configured, may be deployed within a web scraping framework 115a of which SCRAPY™ is an example, to identify and retrieve data of interest from web based sources that are not well tagged by conventional web crawling technology. Multiple dimension time series data store module 120 may receive streaming data from a large plurality of sensors that may be of several different types. Multiple dimension time series data store module 120 may also store any time series data encountered by system 100 such as, but not limited to, environmental factors at insured client infrastructure sites, component sensor readings and system logs of some or all insured client equipment, weather and catastrophic event reports for regions an insured client occupies, political communiques and/or news from regions hosting insured client infrastructure and network service information captures (such as, but not limited to, news, capital funding opportunities and financial feeds, and sales, market condition), and service related customer data. Multiple dimension time series data store module 120 may accommodate irregular and high-volume surges by dynamically allotting network bandwidth and server processing channels to process the incoming data. Inclusion of programming wrappers 120a for languages—examples of which may include, but are not limited to, C++, PERL, PYTHON, and ERLANG™—allows sophisticated programming logic to be added to default functions of multidimensional time series database 120 without intimate knowledge of the core programming, greatly extending breadth of function. Data retrieved by multidimensional time series database 120 and high-volume web crawling module 115 may be further analyzed and transformed into task-optimized results by directed computational graph 155 and associated general transformer service 160 and decomposable transformer service 150 modules. Alternately, data from the multidimensional time series database and high-volume web crawling modules may be sent, often with scripted cuing information determining important vertices 145a, to graph stack service module 145 which, employing standardized protocols for converting streams of information into graph representations of that data, for example open graph internet technology (although the invention is not reliant on any one standard). Through the steps, graph stack service module 145 represents data in graphical form influenced by any pre-determined scripted modifications 145a and stores it in a graph-based data store 145b such as GIRAPH™ or a key-value pair type data store REDIS™, or RIAK™, among others, any of which are suitable for storing graph-based information.

Results of the transformative analysis process may then be combined with further client directives, additional business rules and practices relevant to the analysis and situational information external to the data already available in automated planning service module 130, which also runs powerful information theory-based predictive statistics functions and machine learning algorithms 130a to allow future trends and outcomes to be rapidly forecast based upon the current system derived results and choosing each a plurality of possible business decisions. Then, using all or most available data, automated planning service module 130 may propose business decisions most likely to result in favorable business outcomes with a usably high level of certainty. Closely related to the automated planning service module 130 in the use of system-derived results in conjunction with possible externally supplied additional information in the assistance of end user business decision making, action outcome simulation module 125 with a discrete event simulator programming module 125a coupled with an end user-facing observation and state estimation service 140, which is highly scriptable 140b as circumstances require and has a game engine 140a to more realistically stage possible outcomes of business decisions under consideration, allows business decision makers to investigate the probable outcomes of choosing one pending course of action over another based upon analysis of the current available data.

A significant proportion of the data that is retrieved and transformed by the business operating system, both in real world analyses and as predictive simulations that build upon intelligent extrapolations of real world data, may include a geospatial component. The indexed global tile module 170 and its associated geo tile manager 170a may manage externally available, standardized geospatial tiles and may enable other components of the business operating system, through programming methods, to access and manipulate meta-information associated with geospatial tiles and stored by the system. The business operating system may manipulate this component over the time frame of an analysis and potentially beyond such that, in addition to other discriminators, the data is also tagged, or indexed, with their coordinates of origin on the globe. This may allow the system to better integrate and store analysis specific information with all available information within the same geographical region. Such ability makes possible not only another layer of transformative capability, but may greatly augment presentation of data by anchoring to geographic images including satellite imagery and superimposed maps both during presentation of real world data and simulation runs.

Figure 2:
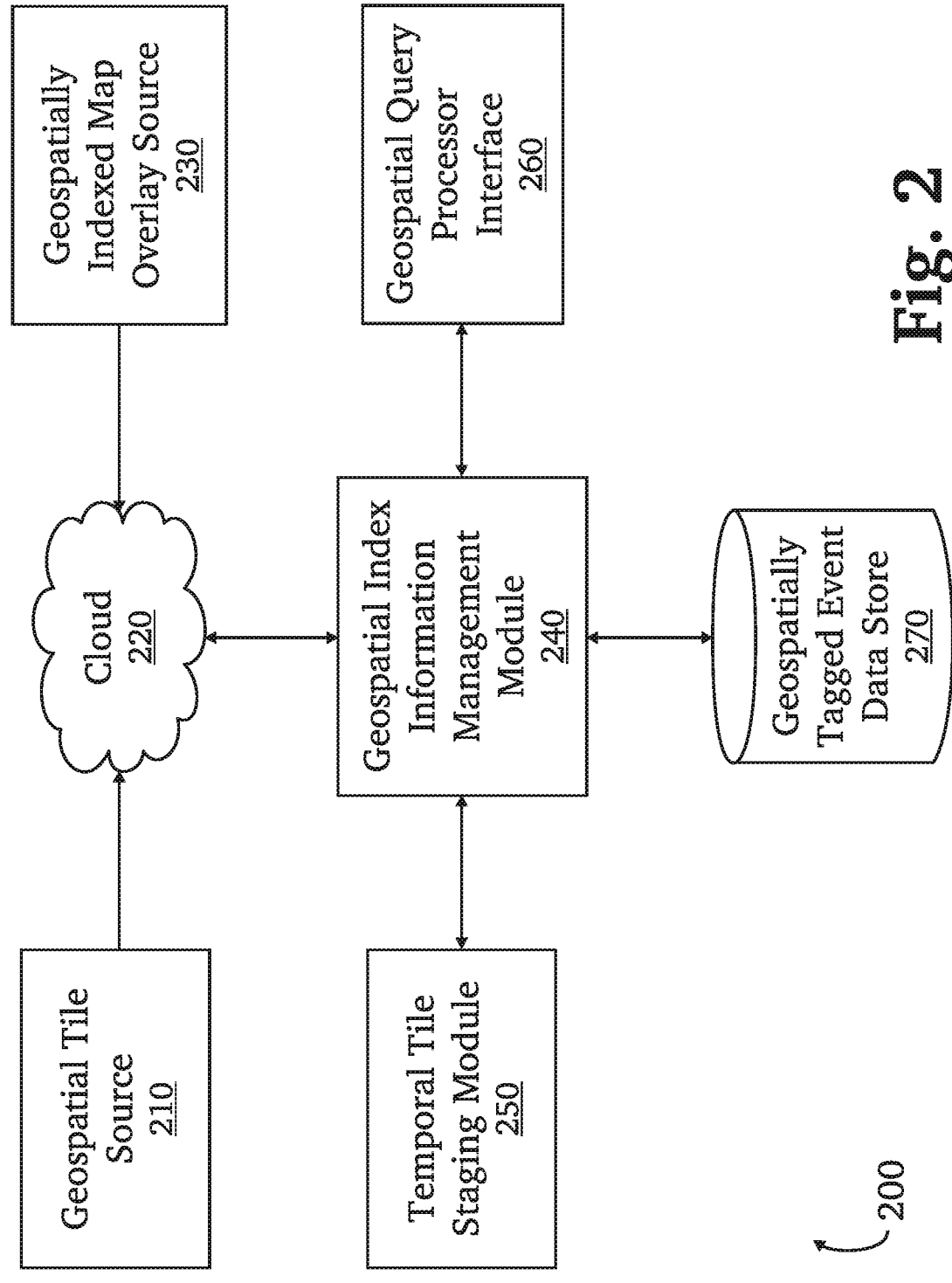
FIG. 2 is a diagram of an indexed global tile module as per one embodiment of the invention.

FIG. 2 is a diagram of an indexed global tile module 200 as per one embodiment of the invention. A significant amount of the data transformed and simulated by the business operating system has an important geospatial component. Indexed global tile module 170 allows both for the geo-tagging storage of data as retrieved by the system as a whole and for the manipulation and display of data using its geological data to augment the data's usefulness in transformation, for example creating ties between two independently acquired data points to more fully explain a phenomenon; or in the display of real world, or simulated results in their correct geospatial context for greatly increased visual comprehension and memorability. Indexed global tile module 170 may consist of a geospatial index information management module which retrieves indexed geospatial tiles from a cloud-based source 210,220 known to those skilled in the art, and may also retrieve available geospatially indexed map overlays from a geospatially indexed map overlay source 230 known to those skilled in the art. Tiles and their overlays, once retrieved, represent large amounts of potentially reusable data and are therefore stored for a pre-determined amount of time to allow rapid recall during one or more analyses on a temporal staging module 250. To be useful, it may be required that both the transformative modules of the business operating system, such as, but not limited to directed computational graph module 155, automated planning service module 130, action outcome simulation module 125, and observational and state estimation service 140 be capable of both accessing and manipulating the retrieved tiles and overlays. A geospatial query processor interface 260 serves as a program interface between these system modules and geospatial index information management module 240 which fulfills the resource requests through specialized direct tile manipulation protocols, which for simplistic example may include "get tile xxx," "zoom," "rotate," "crop," "shape," "stitch," and "highlight" just to name a very few options known to those skilled in the field. During analysis, the geospatial index information management module may control the assignment of geospatial data and the running transforming functions to one or more swimlanes to expedite timely completion and correct storage of the resultant data with associated geotags.

The transformed tiles with all associated transformation tagging may be stored in a geospatially tagged event data store 270 for future review. Alternatively, just the geotagged transformation data or geotagged tile views may be stored for future retrieval of the actual tile and review depending on the need and circumstance. There may also be occasions where time series data from specific geographical locations are stored in multidimensional time series data store 120 with geo-tags provided by geospatial index information management module 240.

Figure 3:
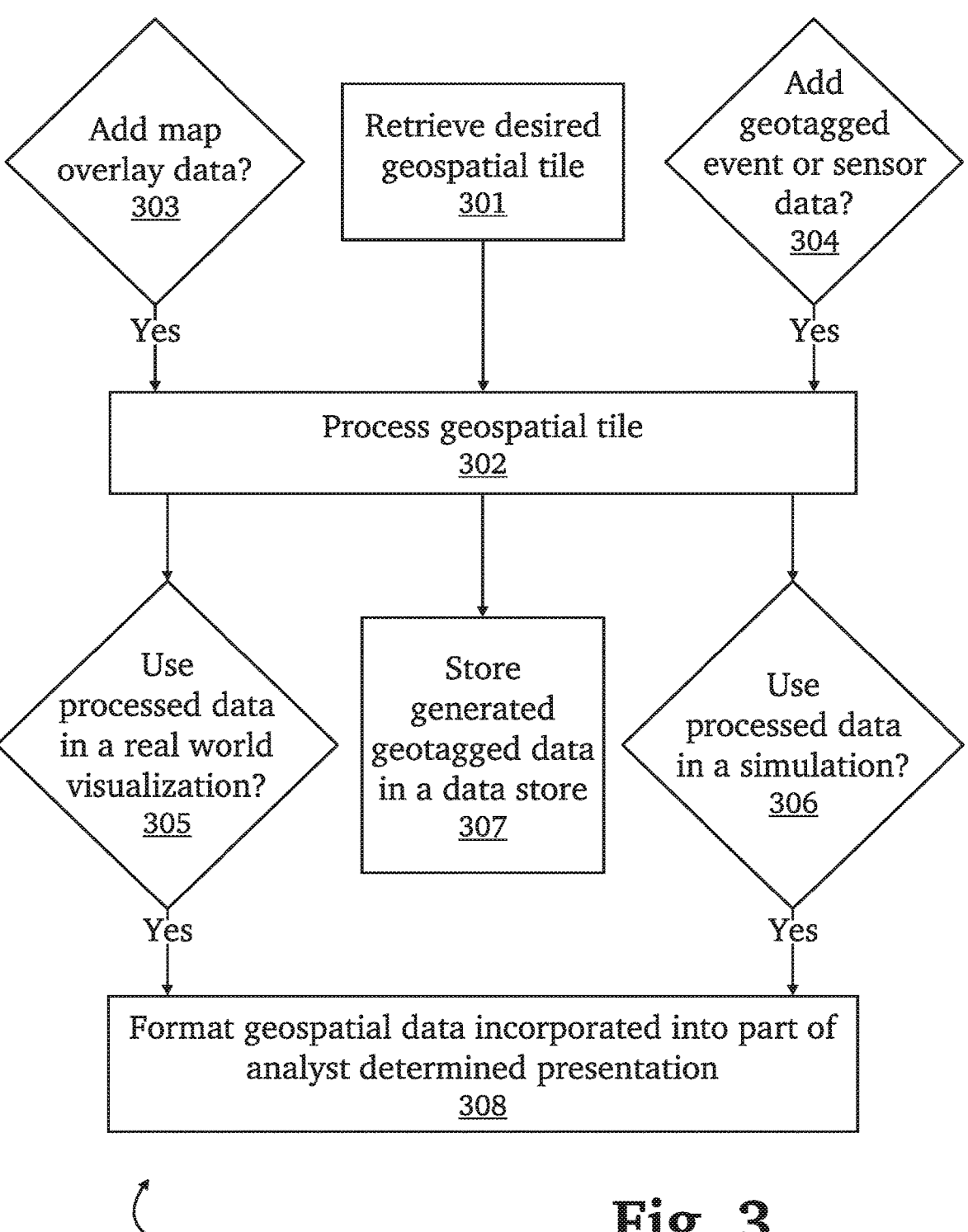
FIG. 3 is a flow diagram illustrating the function of the indexed global tile module as per one embodiment of the invention.

FIG. 3 is a flow diagram illustrating the function 300 of the indexed global tile module as per one embodiment of the invention. Predesignated, indexed geospatial tiles are retrieved from sources known to those skilled in the art at step 301. Available map overlay data, retrieved from one of multiple sources at step 303 known to those skilled in the art may be retrieved per user design. The geospatial tiles may then be processed in one or more of a plurality of ways according to the design of the running analysis at step 302, at which time geo-tagged event or sensor data may be associated with the indexed tile at step 304. Data relating to tile processing, which may include the tile itself is then stored for later review or analysis at step 307. The geo-data, in part, or in its entirety may be used in one or more transformations that are part of a real-world data presentation at step 305. The geo-data in part or in its entirety may be used in one or more transformations that are part of a simulation at step 306. At least some of the geospatial data may be used in an analyst determined direct visual presentation or may be formatted and transmitted for use in third party solutions at step 308.

Figure 4:
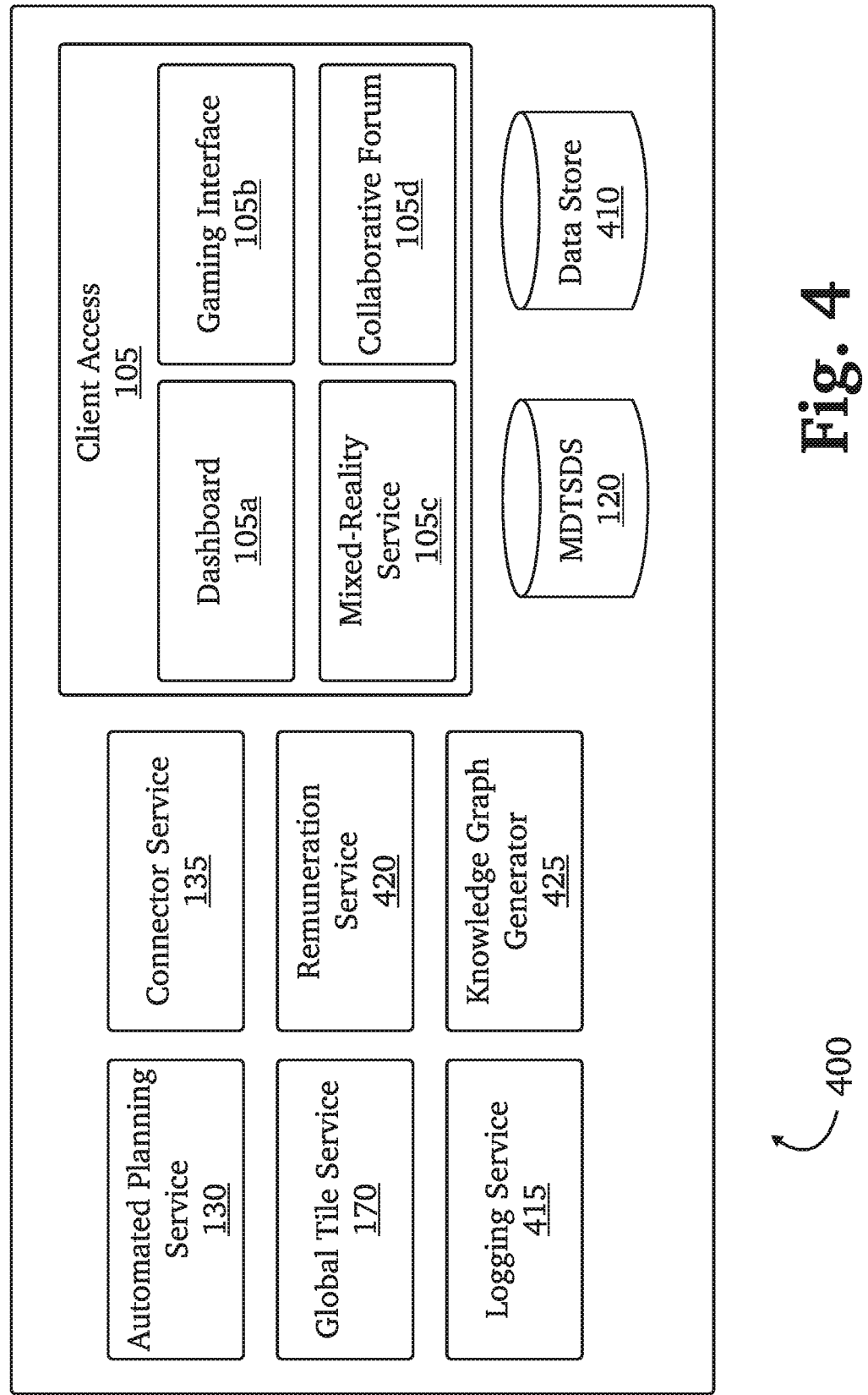
FIG. 4 is a block diagram of a system architecture for an exemplary platform for tracking and managing collaborative projects as used in various embodiments of the invention.

FIG. 4 is a block diagram of a system architecture for an exemplary platform 400 for tracking and managing collaborative projects as used in various embodiments of the invention. Platform 400 may comprise automated planning service 130, connector server 135, client access interface 105, global tile service 170, a multi-dimensional timeseries data store (MDTSDS) 120, a data store 410, a logging service 415, a remuneration service 420, a normalization engine 425, a feasibility analyzer 430, and a knowledge graph analyzer 435 which may all be configurations of one or more instances of business operating system 100 to perform their specific tasks. It should be understood that the components listed may be individual microservices, implemented in logical form, and the like. Additionally, a single system may have more or less components than what is illustrated in FIG. 4.

Automated planning service 130 may be configured to analyze knowledge graphs and time-series data, for example, using transformations or edge analysis, to predict costs, resources, labor requirements, feasibility, and the like required for a particular activity or project. Automated planning service 130 may additionally be configured to automatically set a particular strategy into motion if predefined requirements are met. For example, automated planning service 130 may analyzes the costs, and feasibility of a project that calls for a team comprising workers of particular skillsets, along with other physical resources, such as office space or computing resources. The analysis may determine that a team that meets the requirements for the job, and abundant availability of resources puts the cost of the project below an established threshold, which may have been set by an executive. In this instance, automated planning service 130 may automatically assemble the team, reserve and acquire the required resources (such as computational resources, metering space, or acquiring financial resources), and set the plan into motion. It other embodiments, automatic action may be configured to trigger based on certain event triggers, such as commercial readiness of a new technology, perceived market demand, or the completion of a particular dependency, for example, as a ticket in a project tracking tool like JIRA.

Connector service 135 may be configured to connect to external services to provide an interface for other components to facilitate such tasks as remuneration, recruitment, acquiring financial resources, and the like. Some external services are listed below in FIG. 5A.

Client access interface 105 may be configured to provide external users access to platform 400 and its services through a plurality of different interfaces. Interfaces may include, but is not limited to, a dashboard 105a, which may provide an interface to adjust settings, submit proposals, update a profile, and the like; a gaming interface 105b, which may be, for example, a massively-multiplayer game allowing players to work together to collaboratively, or individually, solve real-world problems adapted for the game world; a mixed-reality service 105c, which may, for instance, provide users with mixed-reality-capable hardware, such as a head-mounted device (HMD) from OCULUS, MAGIC LEAP, and AVEGENT to name to few, with the ability to communicate and interact in a mixed-reality environment; and a collaborative forum 105d, which may be a forum available to users of a particular intranet, and allow the users to communicate their availability and qualifications, post proposals, browse and interact with proposals submitted by other users, and the like. Collaborate forum 105d may be configured to promote established goals. For example, a company wishing to advance in the areas of internet-of-things or machine learning may grant proposals relating to these subjects a higher ranking and visibility, or make resources relating to these fields more readily available. On the other hand, projects in a field such as healthcare, where there is less emphasis on growth, resources may be made scarce, and proposals may be less visible or excluded entirely.

Global tile service 170 may be configured to facility geospatial tracking of assets, contributors, and the like, for instance, through the use of geohashing using a Hilbert curve, which may track both geospatial indices, which may hash, for example, longitude and latitude of assets; and geospatial temporal indices, which may include an additional time-based element to longitude and latitude, and storing the geospatial datal in a hybrid graph-timeseries in MDTSDS 120.

Logging service 415 may be configured to use graph stack service 145 to provide timeseries event logging in a graph-based format to MDTSDS 120 to track people, processes, technologies, resource usage, and the like to aid in accurately attributing value and remuneration to participants in a collaborative endeavor. In some embodiments, instead of MDTSDS 120, logging service 150 may instead log events to a blockchain using a monadic cryptographically secure ledger.

Remuneration service 420 may be configured to use directed computation graph service 155 and the associated transformer services to process event logs from logging service 415 and knowledge graphs created by knowledge graph generator 425 using, for example, transformations and edge analysis, to determine value appropriate distribution of remuneration to contributors. Remuneration service 420 may use connections made by connector service 135 to facilitate automatic monetary rewards. Rewards may also be of a digital nature such as points, badges, notoriety, or cosmetic additions for an avatar or profile, and the like.

Knowledge graph generator 425 may be configured use natural language processing and image recognition capabilities of business operating system 100 to process accompanying text, audio, video, and images to generate a hybrid graph-timeseries representation of accumulated data for a particular case so that the data may be readily and efficiently processed with graph computation functions of business operating system 100. This may include, but is not limited to, competitor data, physical resource availability, architecture computer-aided drawing (CAD) and building information modeling (BIM) data, recruitment information, labor-related details, and the like. Knowledge graph generator 435 may also serve standardize postings by users, which may include profiles, proposals, ideas, projects and the like.

Figure 5A:
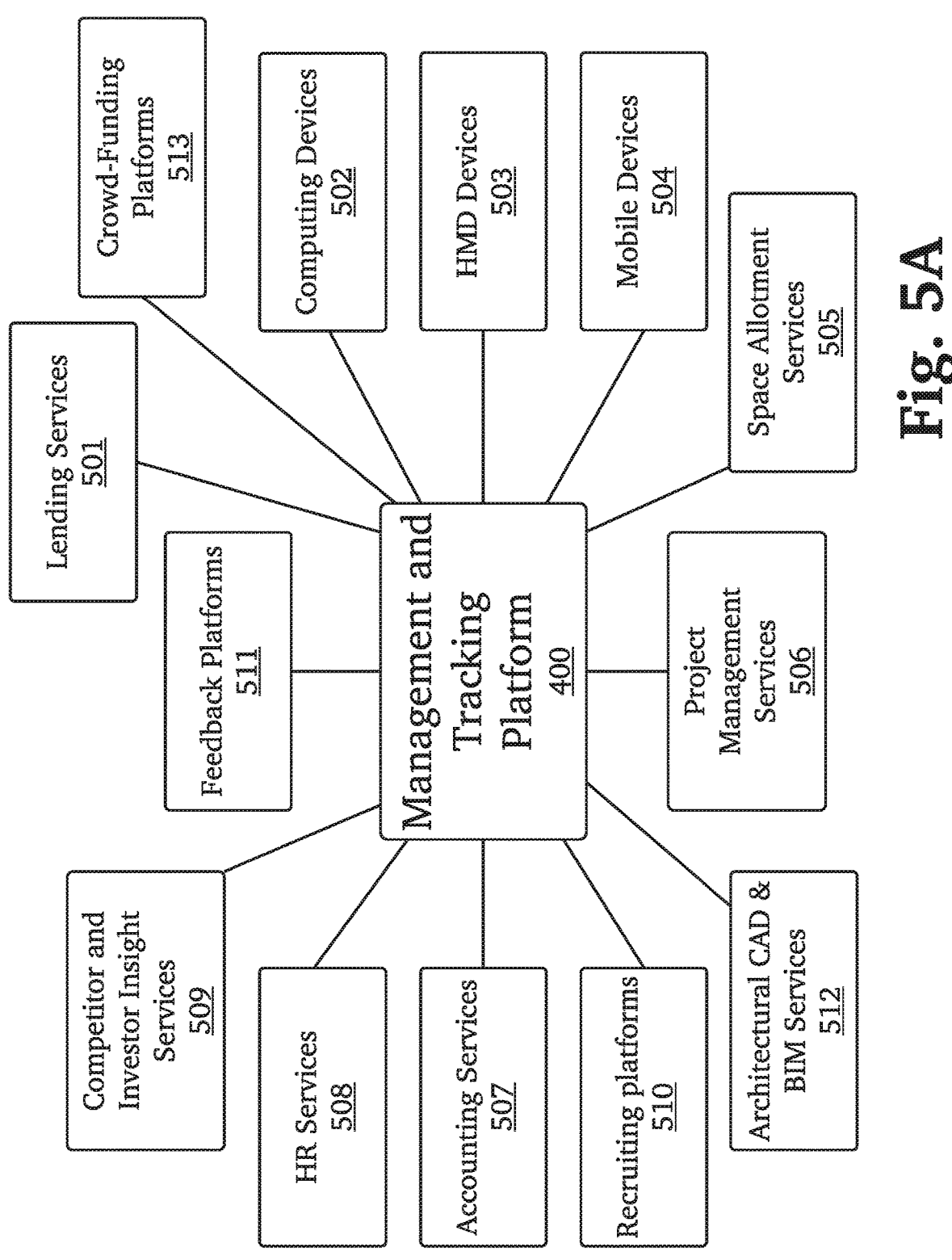
FIGS. 5A and 5B are a block diagrams of exemplary systems employing a platform for tracking and managing collaborative projects according to various embodiments of the invention.
Figure 5B:
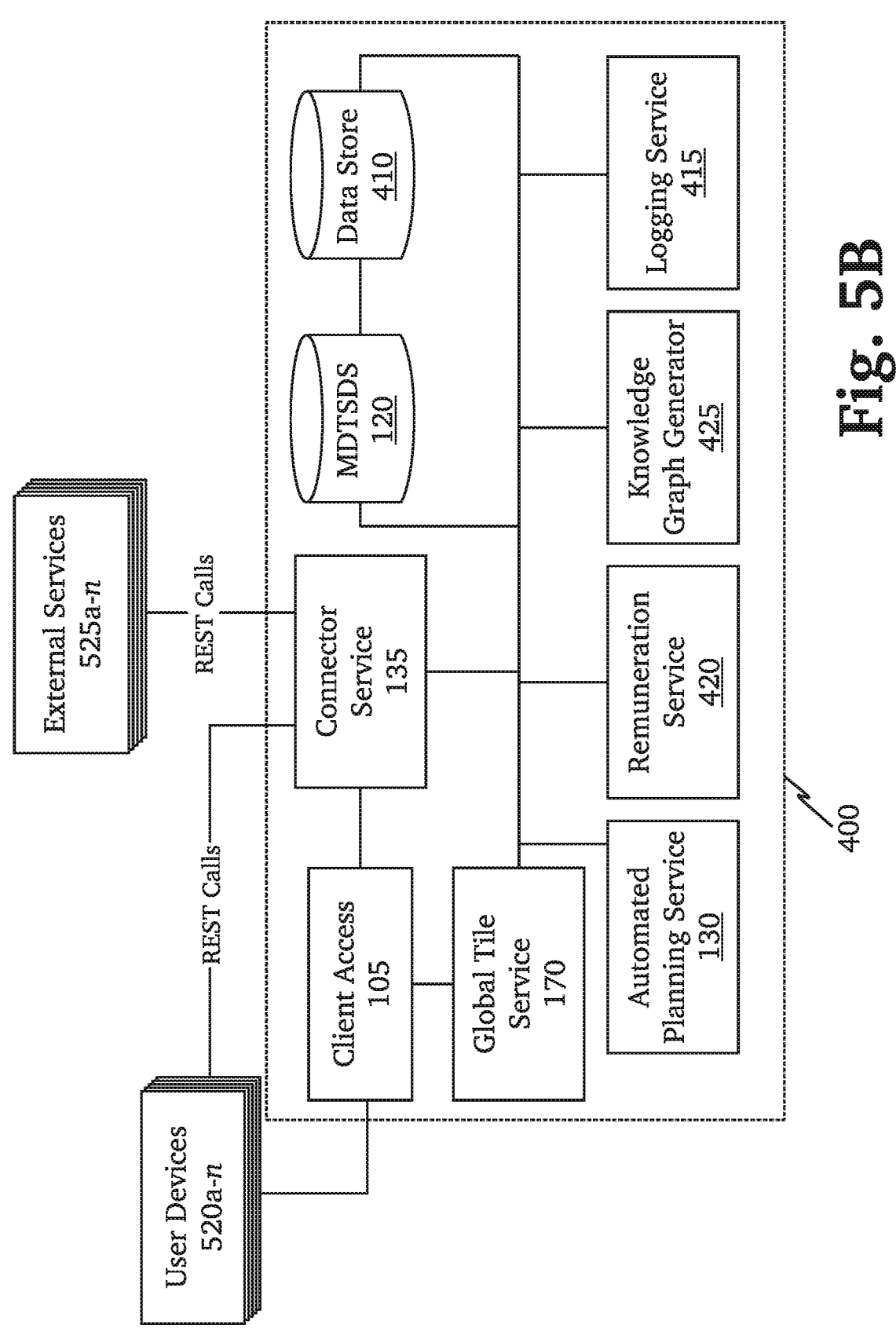

FIGS. 5A and 5B are a block diagrams of exemplary systems employing a platform 400 for tracking and managing collaborative projects according to various embodiments of the invention. As shown in FIGS. 5A and 5B, platform 400 may be accessible by users with a plurality of user devices 520*a-n* including, but not limited to, computing devices 502 (such as laptops or desktop computers), HMD devices 503 (such as OCULUS RIFT, and light field headsets, such as those from MAGIC LEAP and AVEGENT), and mobile devices 504 (such as smart phones and tablets).

Platform 400 may also be configured to connect with a plurality of external services 525*a-n* which may include, but is not limited to, lending services 501 (such LENDING CLUB and PROSPER), space reservation services 505, project management services 506 (such as TRELLO and JIRA), accounting services 507, human-resources services 508, competitor and investor insight platforms 509 (such as OWLER and PITCH BOOK), recruitment platforms 510 (such as LINKEDIN and ZIPRECRUITER), employee feedback platforms 511, architecture CAD and BIM services 512, and crowd-funding platforms 513 (such as KICK-STARTER and INDIEGOGO).

It should be understood that the devices, and services and platforms listed in FIG. 5A are just to provide a general example of what platform 400 may connect and interface with and is not intended to present any limitations imposed by the present invention.

DETAILED DESCRIPTION OF EXEMPLARY ASPECTS

Figure 6:
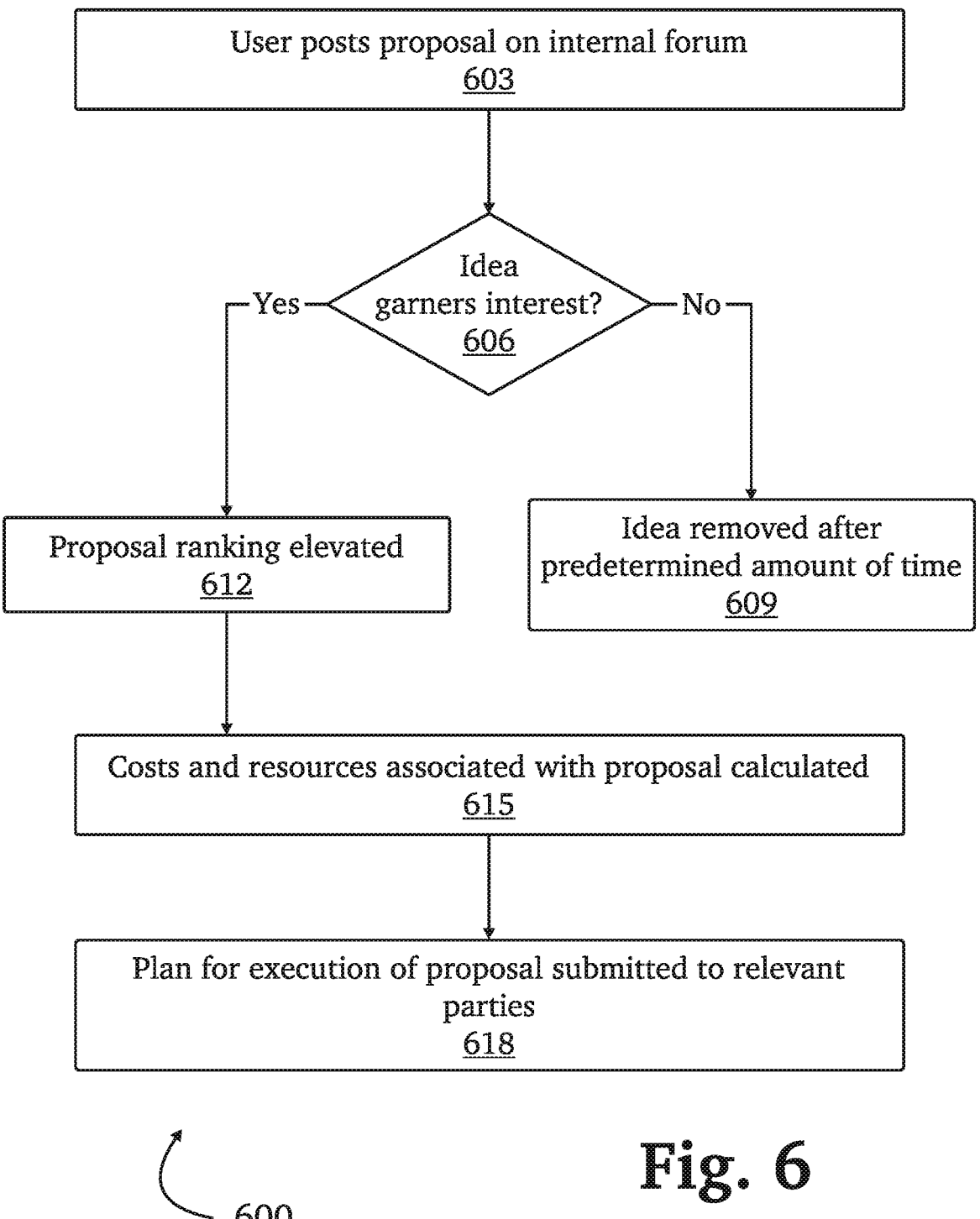
FIG. 6 is a flow diagram illustrating an exemplary method for using employing the platform illustrated in FIG. 4 as a proposal board according to various embodiments of the invention.

FIG. 6 is a flow diagram illustrating an exemplary method 600 for using platform 400 as a proposal board according to various embodiments of the invention. At an initial step 603, a user posts a proposal on an internal forum, for example, a forum provided and available to users on a particular intranet. While in some embodiments, platform 400 may be configured to allow users to freely post ideas and proposals, other embodiments may require moderation and review of proposals to ensure a certain standard of quality is maintained. At decision block 606, if the idea does not garner sufficient interest from other users, the idea is removed at step 609, which may be automated or through the actions of an administrative user depending on configuration and requirements of the implementation. If the idea accumulates enough interest from other participants at decision block 606, the ranking may be elevated at step 612. This may include, for example, putting the proposal in a position with high visibility, notifying other participants, and the like. At step 615, costs and resources associated with the proposal are calculated, analyzed, and calculated by platform 400, which may include, physical resources, monetary resources, personnel required along with associated labor costs, compute resources, and the like. At step 618, a plan for executing the proposal is submitted to relevant parties, for example, a manager with the necessary power to put the proposal into effect. In some embodiments, users who submit proposals that go on to become successful endeavors may be granted remuneration, which may vary based on significance associated with the proposal.

Figure 7:
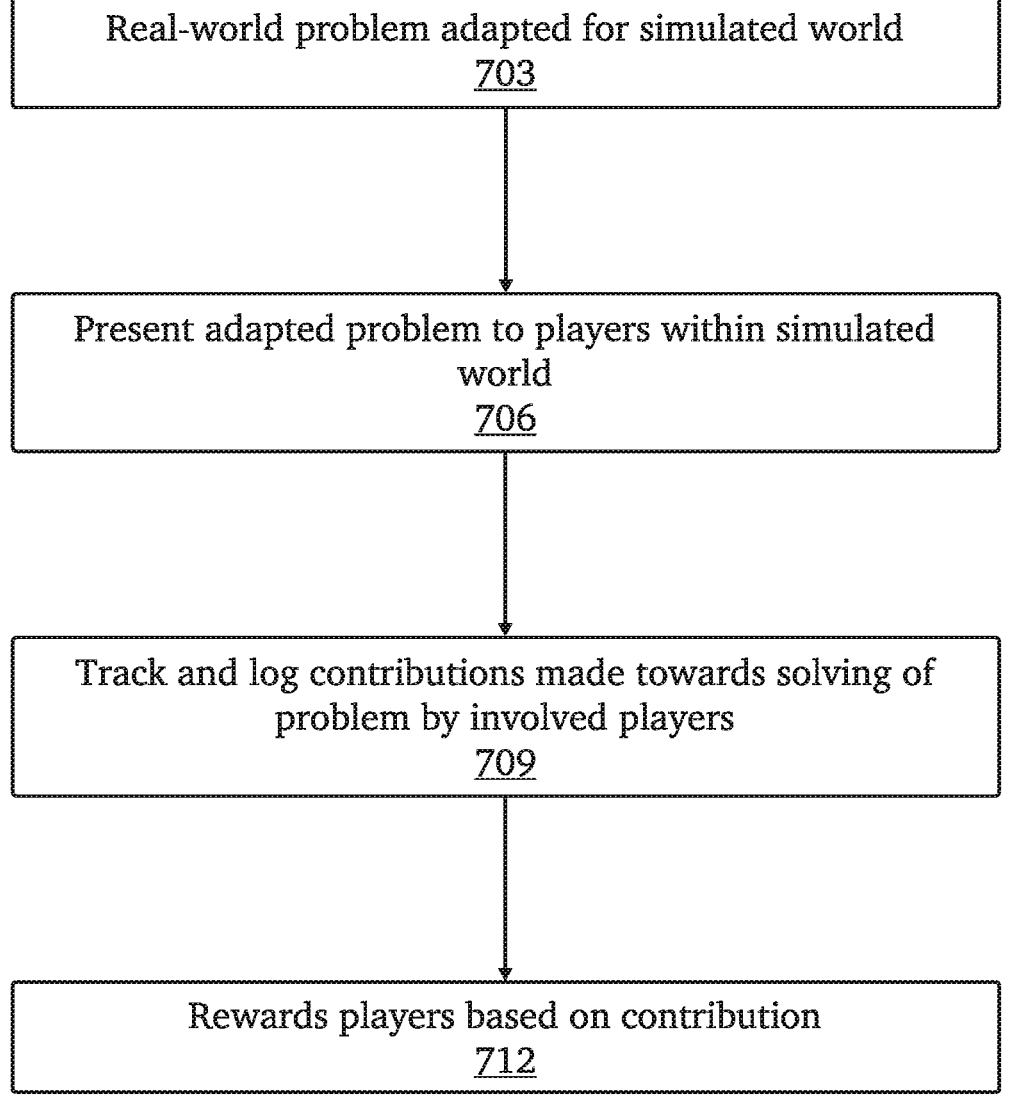
FIG. 7 is a flow chart illustrating an exemplary method for using the platform illustrated in FIG. 4 as a massively-multiplayer game in which players may be rewarded for solving adapted versions of real-world problems according to various embodiments of the invention.

FIG. 7 is a flow chart illustrating an exemplary method 700 for using platform 400 as a massively multiplayer game in which players may be rewarded for solving adapted versions of real-world problems according to various embodiments of the invention. At an initial step 703, platform 400 may adapt a problem to fit the context and setting of a simulated world. The problem may be automatically determined and selected by, for example, through data gathering and processing functions of business operating system 100, or input by an administrative user. At step 706, the adapted problem is presented to players in the simulated world as an in-game conflict of problem. The level of awareness of the real-world problem the players are solving may be controlled by a developer, for example, players may be fully aware of the problem and its real-world context, players may be aware that it is a real-world problem with obfuscated context, or the players may not be aware that the problem is an adapted real-world problem at all. At step 709, player contributions are logged and tracked by platform 400 in solving the presented problem. At step 712, platform 400 may apportion remuneration based on the logged contributions, which may vary based on, for example, how much skill and effort was involved in solving the problem, role played in the solving the problem, number of players involved in solving the problem, real-world impact associated with the problem, and the like.

Figure 8:
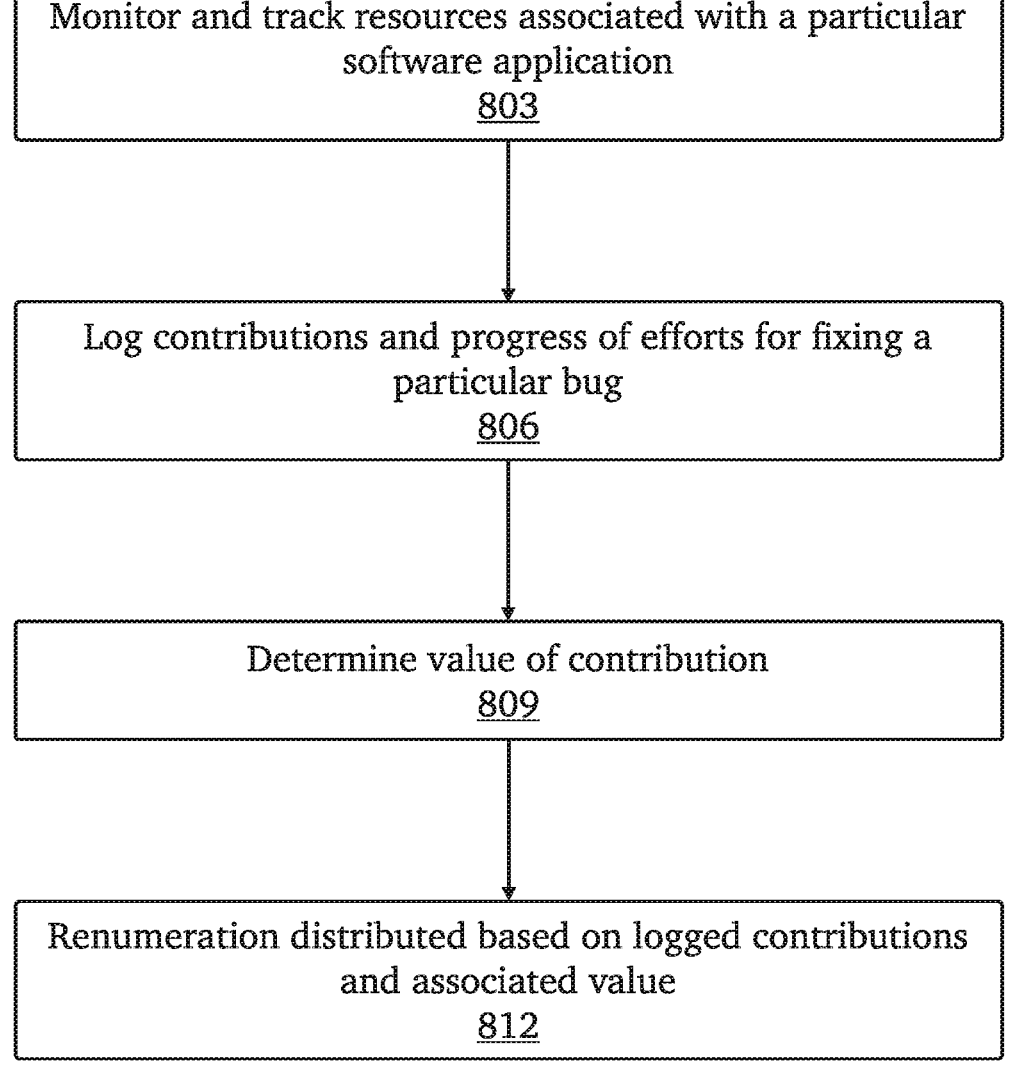
FIG. 8 is a flow chart illustrating a method for using the platform illustrated in FIG. 4 for equitable remuneration for community-sourced contributions to fixing software bugs according to various embodiments of the invention.

FIG. 8 is a flow chart illustrating a method 800 for using platform 400 for equitable remuneration for community-sourced contributions to fixing software bugs according to various embodiments of the invention. At an initial step 803, platform 400 monitors and tracks resources associated with a particular software application. This may include connecting to project management services like TRELLO, a support forum or forum thread for the particular software, and the like. At step 806, platform 400 tracks and logs bugs, both new discovers and existing, efforts made to tracking down the bug, efforts and contributes made towards fixing the bug, and the like. At step 809, platform 400 may determine the value of contributions made by community members which may be based on, for example, severity of a particular bug, how much effort went into fixing the bug, economic value in relation to competition, and economical value associated with various logistics that may be affected by the bug. At step 812, platform 400 may distribute remuneration based on logged contributions and the previously determined value.

Figure 9:
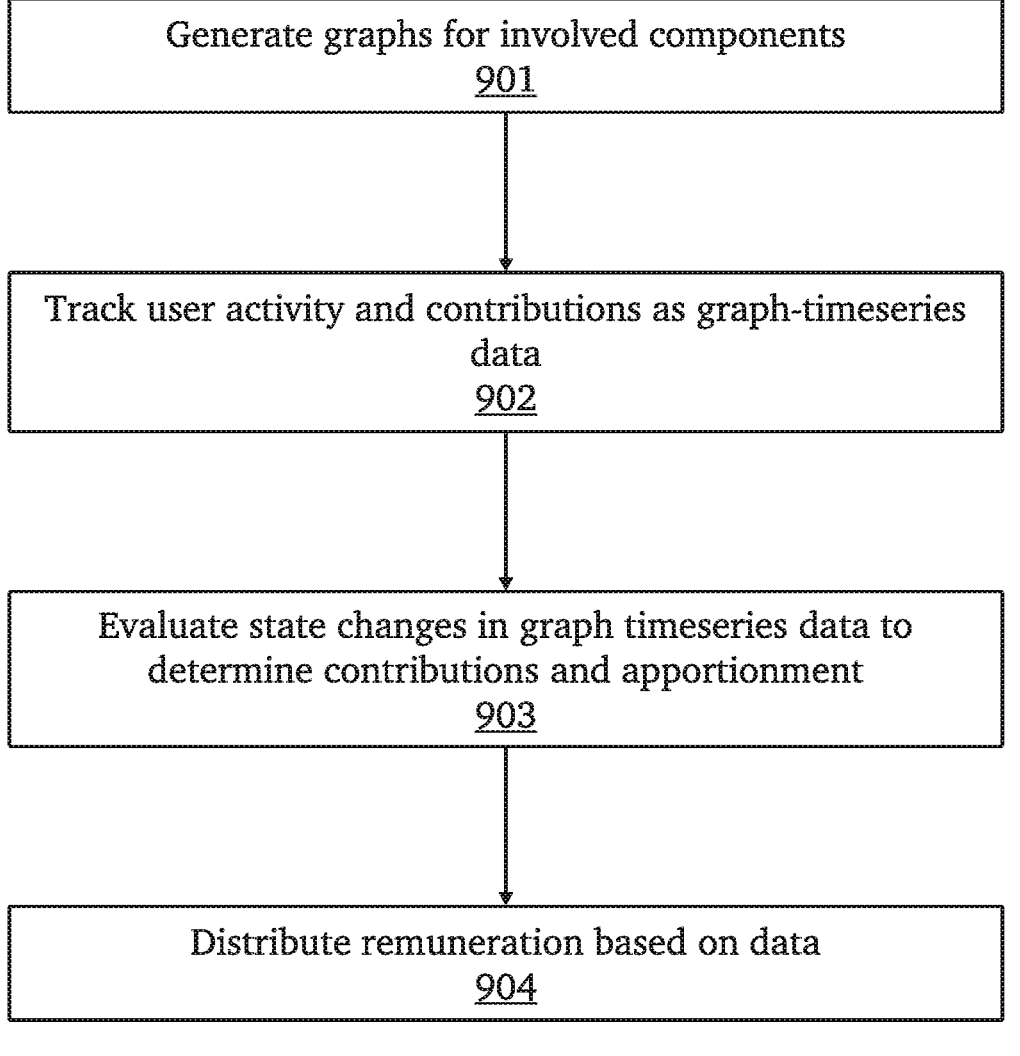
FIG. 9 is a flow diagram illustrating and exemplary method for tracking contributions and determining contributions through graph analysis according to various embodiments of the invention.

FIG. 9 is a flow diagram illustrating and exemplary method 900 for tracking contributions and determining contributions through graph analysis according to various embodiments of the invention. At an initial step 901, graphs may be systematically generated using a graph stack service, a knowledge generator, and the like based on the requirements of a particular implementation. This may involve, for example, generating a set of graphs for users, projects, and tasks to track user activity and contributions to each task or project. At step 902, activity and interactions amongst the graphs may be tracked and recorded as timeseries data. At step 903, graph analysis may be performed on the graphs in conjunction with the recorded timeseries data using the applicable component of system 100 or platform 400. This may include, for example, tracking a particular user's contributions via time spent or work contributed to a project or task, and then analysis the state changes and timeseries data using edge analysis to accurately determine what tasks a particular worked on and exactly how much was contributed in each instance. At step 904, contributions data may be processed by components of platform 400. For example, remuneration service 420 may processing the data to appropriately apportion remuneration.

It should be appreciated that for the methods shown in FIGS. 6-9, platform 400 may not necessary host the discussed service in each respective method but may be utilized as a backend providing tracking and remuneration services to external services developed using other available development platforms.

Hardware Architecture

Generally, the techniques disclosed herein may be implemented on hardware or a combination of software and hardware. For example, they may be implemented in an operating system kernel, in a separate user process, in a library package bound into network applications, on a specially constructed machine, on an application-specific integrated circuit (ASIC), or on a network interface card.

Software/hardware hybrid implementations of at least some of the aspects disclosed herein may be implemented on a programmable network-resident machine (which should be understood to include intermittently connected network-aware machines) selectively activated or reconfigured by a computer program stored in memory. Such network devices may have multiple network interfaces that may be configured or designed to utilize different types of network communication protocols. A general architecture for some of these machines may be described herein in order to illustrate one or more exemplary means by which a given unit of functionality may be implemented. According to specific aspects, at least some of the features or functionalities of the various aspects disclosed herein may be implemented on one or more general-purpose computers associated with one or more networks, such as for example an end-user computer system, a client computer, a network server or other server system, a mobile computing device (e.g., tablet computing device, mobile phone, smartphone, laptop, or other appropriate computing device), a consumer electronic device, a music player, or any other suitable electronic device, router, switch, or other suitable device, or any combination thereof. In at least some aspects, at least some of the features or functionalities of the various aspects disclosed herein may be implemented in one or more virtualized computing environments (e.g., network computing clouds, virtual machines hosted on one or more physical computing machines, or other appropriate virtual environments).

Figure 10:
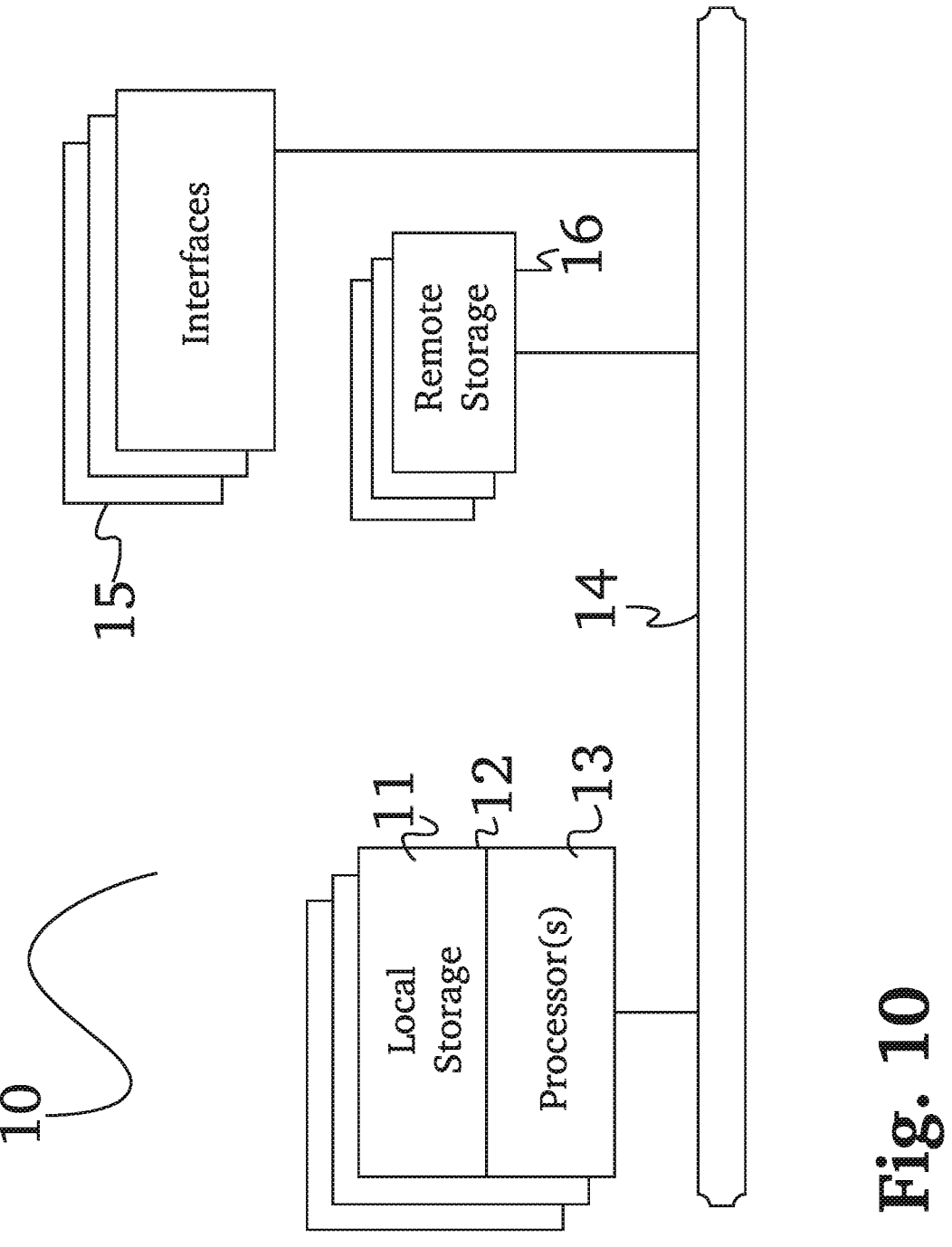
FIG. 10 is a block diagram illustrating an exemplary hardware architecture of a computing device used in various embodiments of the invention.

Referring now to FIG. 10, there is shown a block diagram depicting an exemplary computing device 10 suitable for implementing at least a portion of the features or functionalities disclosed herein. Computing device 10 may be, for example, any one of the computing machines listed in the previous paragraph, or indeed any other electronic device capable of executing software- or hardware-based instructions according to one or more programs stored in memory. Computing device 10 may be configured to communicate with a plurality of other computing devices, such as clients or servers, over communications networks such as a wide area network a metropolitan area network, a local area network, a wireless network, the Internet, or any other network, using known protocols for such communication, whether wireless or wired.

In one aspect, computing device 10 includes one or more central processing units (CPU) 12, one or more interfaces 15, and one or more busses 14 (such as a peripheral component interconnect (PCI) bus). When acting under the control of appropriate software or firmware, CPU 12 may be responsible for implementing specific functions associated with the functions of a specifically configured computing device or machine. For example, in at least one aspect, a computing device 10 may be configured or designed to function as a server system utilizing CPU 12, local memory 11 and/or remote memory 16, and interface(s) 15. In at least one aspect, CPU 12 may be caused to perform one or more of the different types of functions and/or operations under the control of software modules or components, which for example, may include an operating system and any appropriate applications software, drivers, and the like.

CPU 12 may include one or more processors 13 such as, for example, a processor from one of the Intel, ARM, Qualcomm, and AMD families of microprocessors. In some aspects, processors 13 may include specially designed hardware such as application-specific integrated circuits (ASICs), electrically erasable programmable read-only memories (EEPROMs), field-programmable gate arrays (FPGAs), and so forth, for controlling operations of computing device 10. In a particular aspect, a local memory 11 (such as non-volatile random access memory (RAM) and/or read-only memory (ROM), including for example one or more levels of cached memory) may also form part of CPU 12. However, there are many different ways in which memory may be coupled to system 10. Memory 11 may be used for a variety of purposes such as, for example, caching and/or storing data, programming instructions, and the like. It should be further appreciated that CPU 12 may be one of a variety of system-on-a-chip (SOC) type hardware that may include additional hardware such as memory or graphics processing chips, such as a QUALCOMM SNAPDRAGON™ or SAMSUNG EXYNOS™ CPU as are becoming increasingly common in the art, such as for use in mobile devices or integrated devices.

As used herein, the term "processor" is not limited merely to those integrated circuits referred to in the art as a processor, a mobile processor, or a microprocessor, but broadly refers to a microcontroller, a microcomputer, a programmable logic controller, an application-specific integrated circuit, and any other programmable circuit.

In one aspect, interfaces 15 are provided as network interface cards (NICs). Generally, NICs control the sending and receiving of data packets over a computer network; other types of interfaces 15 may for example support other peripherals used with computing device 10. Among the interfaces that may be provided are Ethernet interfaces, frame relay interfaces, cable interfaces, DSL interfaces, token ring interfaces, graphics interfaces, and the like. In addition, various types of interfaces may be provided such as, for example, universal serial bus (USB), Serial, Ethernet, FIREWIRE™, THUNDERBOLT™, PCI, parallel, radio frequency (RF), BLUETOOTH™, near-field communications (e.g., using near-field magnetics), 802.11 (WiFi), frame relay, TCP/IP, ISDN, fast Ethernet interfaces, Gigabit Ethernet interfaces, Serial ATA (SATA) or external SATA (ESATA) interfaces, high-definition multimedia interface (HDMI), digital visual interface (DVI), analog or digital audio interfaces, asynchronous transfer mode (ATM) interfaces, high-speed serial interface (HSSI) interfaces, Point of Sale (POS) interfaces, fiber data distributed interfaces (FD-DIs), and the like. Generally, such interfaces 15 may include physical ports appropriate for communication with appropriate media. In some cases, they may also include an independent processor (such as a dedicated audio or video processor, as is common in the art for high-fidelity A/V hardware interfaces) and, in some instances, volatile and/or non-volatile memory (e.g., RAM).

Although the system shown in FIG. 10 illustrates one specific architecture for a computing device 10 for implementing one or more of the aspects described herein, it is by no means the only device architecture on which at least a portion of the features and techniques described herein may be implemented. For example, architectures having one or any number of processors 13 may be used, and such processors 13 may be present in a single device or distributed among any number of devices. In one aspect, a single processor 13 handles communications as well as routing computations, while in other aspects a separate dedicated communications processor may be provided. In various aspects, different types of features or functionalities may be implemented in a system according to the aspect that includes a client device (such as a tablet device or smartphone running client software) and server systems (such as a server system described in more detail below).

Regardless of network device configuration, the system of an aspect may employ one or more memories or memory modules (such as, for example, remote memory block 16 and local memory 11) configured to store data, program instructions for the general-purpose network operations, or other information relating to the functionality of the aspects described herein (or any combinations of the above). Program instructions may control execution of or comprise an operating system and/or one or more applications, for example. Memory 16 or memories 11, 16 may also be configured to store data structures, configuration data, encryption data, historical system operations information, or any other specific or generic non-program information described herein.

Because such information and program instructions may be employed to implement one or more systems or methods described herein, at least some network device aspects may include nontransitory machine-readable storage media, which, for example, may be configured or designed to store program instructions, state information, and the like for performing various operations described herein. Examples of such nontransitory machine-readable storage media include, but are not limited to, magnetic media such as hard disks, floppy disks, and magnetic tape; optical media such as CD-ROM disks; magneto-optical media such as optical disks, and hardware devices that are specially configured to store and perform program instructions, such as read-only memory devices (ROM), flash memory (as is common in mobile devices and integrated systems), solid state drives (SSD) and "hybrid SSD" storage drives that may combine physical components of solid state and hard disk drives in a single hardware device (as are becoming increasingly common in the art with regard to personal computers), memristor memory, random access memory (RAM), and the like. It should be appreciated that such storage means may be integral and non-removable (such as RAM hardware modules that may be soldered onto a motherboard or otherwise integrated into an electronic device), or they may be removable such as swappable flash memory modules (such as "thumb drives" or other removable media designed for rapidly exchanging physical storage devices), "hot-swappable" hard disk drives or solid state drives, removable optical storage discs, or other such removable media, and that such integral and removable storage media may be utilized interchangeably. Examples of program instructions include both object code, such as may be produced by a compiler, machine code, such as may be produced by an assembler or a linker, byte code, such as may be generated by for example a JAVA™ compiler and may be executed using a Java virtual machine or equivalent, or files containing higher level code that may be executed by the computer using an interpreter (for example, scripts written in Python, Perl, Ruby, Groovy, or any other scripting language).

Figure 11:
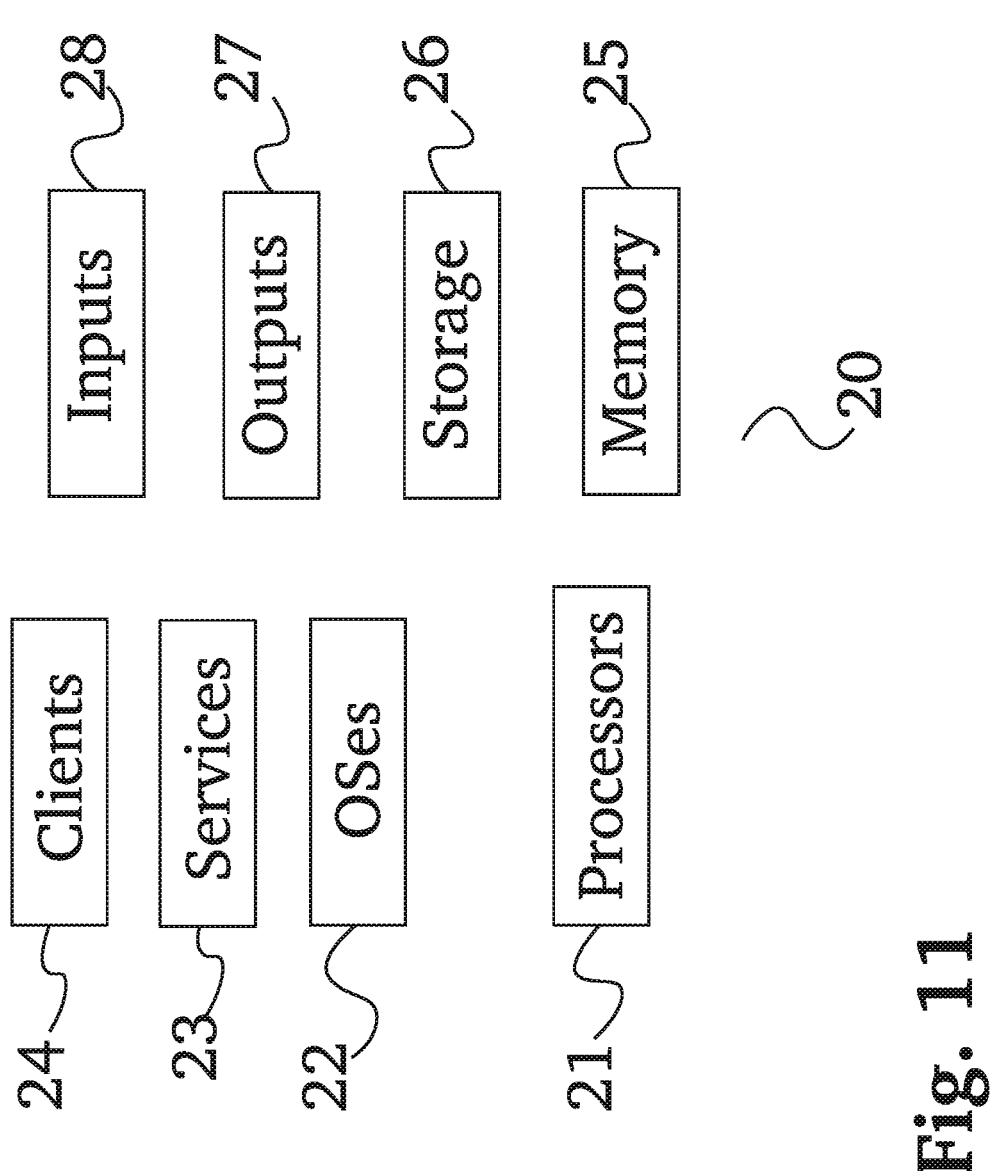
FIG. 11 is a block diagram illustrating an exemplary logical architecture for a client device, according to various embodiments of the invention.

In some aspects, systems may be implemented on a standalone computing system. Referring now to FIG. 11, there is shown a block diagram depicting a typical exemplary architecture of one or more aspects or components thereof on a standalone computing system. Computing device 20 includes processors 21 that may run software that carry out one or more functions or applications of aspects, such as for example a client application 24. Processors 21 may carry out computing instructions under control of an operating system 22 such as, for example, a version of MICROSOFT WINDOWS™ operating system, APPLE macOS™ or iOS™ operating systems, some variety of the Linux operating system, ANDROID™ operating system, or the like. In many cases, one or more shared services 23 may be operable in system 20, and may be useful for providing common services to client applications 24. Services 23 may for example be WINDOWS™ services, user-space common services in a Linux environment, or any other type of common service architecture used with operating system 21. Input devices 28 may be of any type suitable for receiving user input, including for example a keyboard, touchscreen, microphone (for example, for voice input), mouse, touchpad, trackball, or any combination thereof. Output devices 27 may be of any type suitable for providing output to one or more users, whether remote or local to system 20, and may include for example one or more screens for visual output, speakers, printers, or any combination thereof. Memory 25 may be random-access memory having any structure and architecture known in the art, for use by processors 21, for example to run software. Storage devices 26 may be any magnetic, optical, mechanical, memristor, or electrical storage device for storage of data in digital form (such as those described above, referring to FIG. 10). Examples of storage devices 26 include flash memory, magnetic hard drive, CD-ROM, and/or the like.

Figure 12:
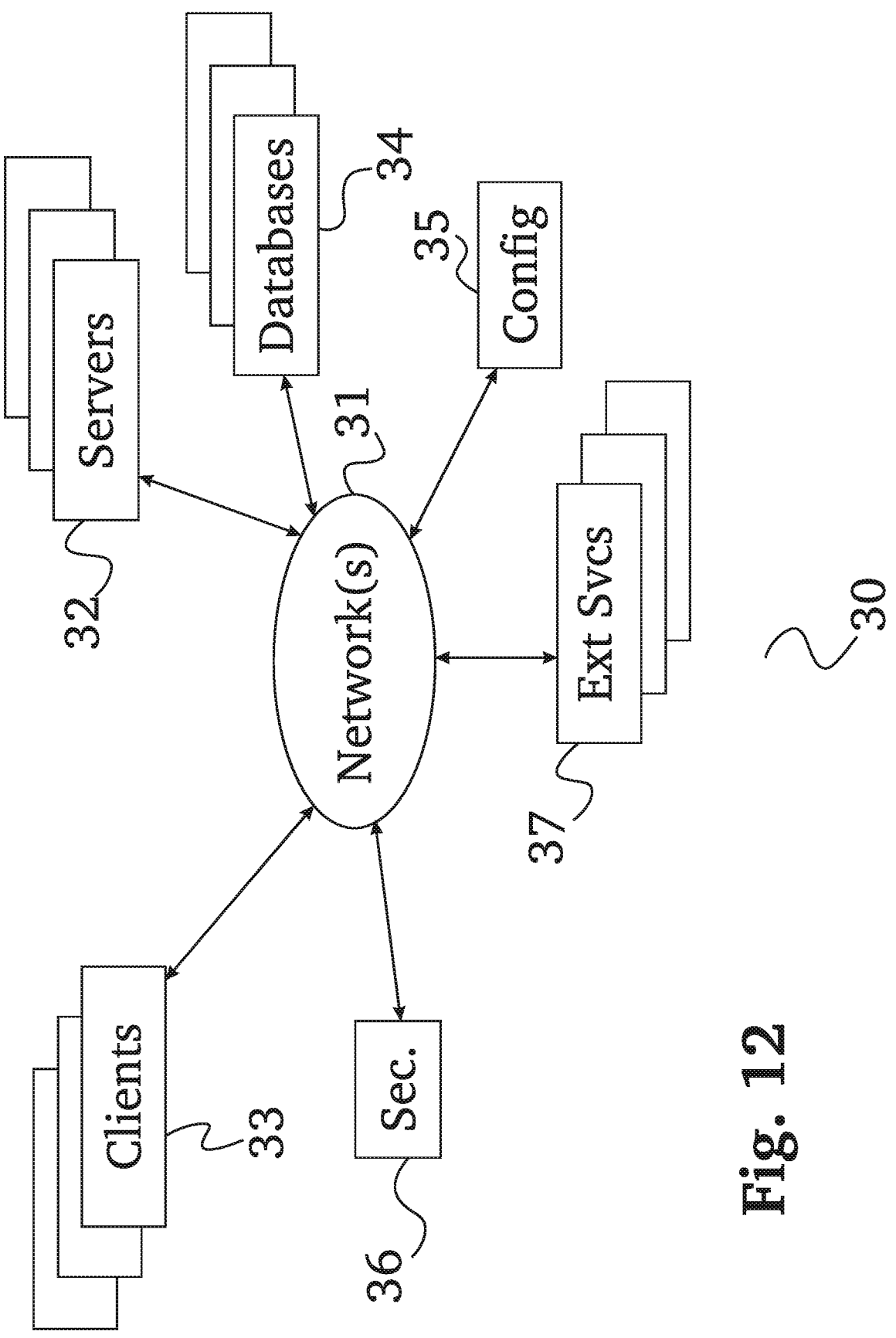
FIG. 12 is a block diagram illustrating an exemplary architectural arrangement of clients, servers, and external services, according to various embodiments of the invention.

In some aspects, systems may be implemented on a distributed computing network, such as one having any number of clients and/or servers. Referring now to FIG. 12, there is shown a block diagram depicting an exemplary architecture 30 for implementing at least a portion of a system according to one aspect on a distributed computing network. According to the aspect, any number of clients 33 may be provided. Each client 33 may run software for implementing client-side portions of a system; clients may comprise a system 20 such as that illustrated in FIG. 11. In addition, any number of servers 32 may be provided for handling requests received from one or more clients 33. Clients 33 and servers 32 may communicate with one another via one or more electronic networks 31, which may be in various aspects any of the Internet, a wide area network, a mobile telephony network (such as CDMA or GSM cellular networks), a wireless network (such as WiFi, WiMAX, LTE, and so forth), or a local area network (or indeed any network topology known in the art; the aspect does not prefer any one network topology over any other). Networks 31 may be implemented using any known network protocols, including for example wired and/or wireless protocols.

In addition, in some aspects, servers 32 may call external services 37 when needed to obtain additional information, or to refer to additional data concerning a particular call. Communications with external services 37 may take place, for example, via one or more networks 31. In various aspects, external services 37 may comprise web-enabled services or functionality related to or installed on the hardware device itself. For example, in one aspect where client applications 24 are implemented on a smartphone or other electronic device, client applications 24 may obtain information stored in a server system 32 in the cloud or on an external service 37 deployed on one or more of a particular enterprise's or user's premises.

In some aspects, clients 33 or servers 32 (or both) may make use of one or more specialized services or appliances that may be deployed locally or remotely across one or more networks 31. For example, one or more databases 34 may be used or referred to by one or more aspects. It should be understood by one having ordinary skill in the art that databases 34 may be arranged in a wide variety of architectures and using a wide variety of data access and manipulation means. For example, in various aspects one or more databases 34 may comprise a relational database system using a structured query language (SQL), while others may comprise an alternative data storage technology such as those referred to in the art as "NoSQL" (for example, HADOOP CASSANDRA™, GOOGLE BIGTABLE™, and so forth). In some aspects, variant database architectures such as column-oriented databases, in-memory databases, clustered databases, distributed databases, or even flat file data repositories may be used according to the aspect. It will be appreciated by one having ordinary skill in the art that any combination of known or future database technologies may be used as appropriate, unless a specific database technology or a specific arrangement of components is specified for a particular aspect described herein. Moreover, it should be appreciated that the term "database" as used herein may refer to a physical database machine, a cluster of machines acting as a single database system, or a logical database within an overall database management system. Unless a specific meaning is specified for a given use of the term "database", it should be construed to mean any of these senses of the word, all of which are understood as a plain meaning of the term "database" by those having ordinary skill in the art.

Similarly, some aspects may make use of one or more security systems 36 and configuration systems 35. Security and configuration management are common information technology (IT) and web functions, and some amount of each are generally associated with any IT or web systems. It should be understood by one having ordinary skill in the art that any configuration or security subsystems known in the art now or in the future may be used in conjunction with aspects without limitation, unless a specific security 36 or configuration system 35 or approach is specifically required by the description of any specific aspect.

Figure 13:
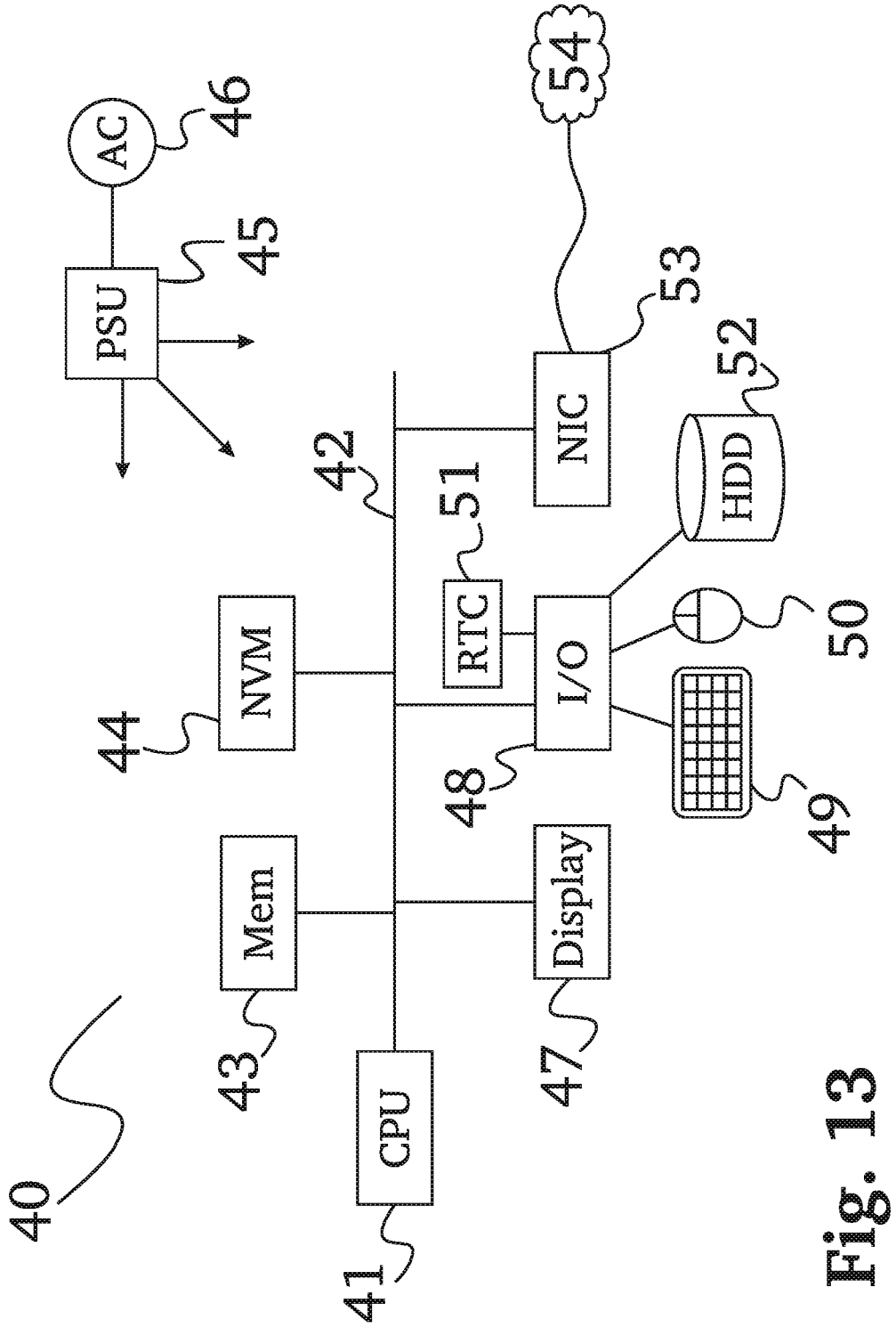
FIG. 13 is another block diagram illustrating an exemplary hardware architecture of a computing device used in various embodiments of the invention.

FIG. 13 shows an exemplary overview of a computer system 40 as may be used in any of the various locations throughout the system. It is exemplary of any computer that may execute code to process data. Various modifications and changes may be made to computer system 40 without departing from the broader scope of the system and method disclosed herein. Central processor unit (CPU) 41 is connected to bus 42, to which bus is also connected memory 43, nonvolatile memory 44, display 47, input/output (I/O) unit 48, and network interface card (NIC) 53. I/O unit 48 may, typically, be connected to keyboard 49, pointing device 50, hard disk 52, and real-time clock 51. NIC 53 connects to network 54, which may be the Internet or a local network, which local network may or may not have connections to the Internet. Also shown as part of system 40 is power supply unit 45 connected, in this example, to a main alternating current (AC) supply 46. Not shown are batteries that could be present, and many other devices and modifications that are well known but are not applicable to the specific novel functions of the current system and method disclosed herein. It should be appreciated that some or all components illustrated may be combined, such as in various integrated applications, for example Qualcomm or Samsung system-on-a-chip (SOC) devices, or whenever it may be appropriate to combine multiple capabilities or functions into a single hardware device (for instance, in mobile devices such as smartphones, video game consoles, in-vehicle computer systems such as navigation or multimedia systems in automobiles, or other integrated hardware devices).

In various aspects, functionality for implementing systems or methods of various aspects may be distributed among any number of client and/or server components. For example, various software modules may be implemented for performing various functions in connection with the system of any particular aspect, and such modules may be variously implemented to run on server and/or client components.

The skilled person will be aware of a range of possible modifications of the various aspects described above. Accordingly, the present invention is defined by the claims and their equivalents.

What is claimed is:

1. A computing system for management and tracking of collaborative projects employing a collaborative platform, the computing system comprising:
 one or more hardware processors configured for:
  tracking contributions of a plurality of participants of a monitored project, wherein the contributions are formatted in a time-series contributions dataset;
  gathering information from a plurality of sources including at least a competitor and investment insight service;
  constructing a knowledge graph based at least on the timeseries-based contributions dataset and the information from the plurality of sources;
  determining an associated value of the monitored project based at least on economic value of the monitored project by performing a plurality of graph analysis and transformations including edge analysis of the knowledge graph;
  determining appropriate apportionment of remuneration based on relative contribution of the plurality of participants in the monitored project based on the plurality of graph calculations and transformations, including the edge analysis of the knowledge graph, and timeseries analysis on the time-series contributions dataset; and
  automatically allocating remuneration in the determined apportionment.

2. The computing system of claim 1, wherein the one or more hardware processors are further configured for providing a user with an interface for interacting with the system.

3. The computing system of claim 2, wherein the interface is a labor board for posting and browsing resources.

4. The computing system of claim 2, wherein the interface is a massively multiplayer game, where a plurality of players is rewarded for solving in-game problems.

5. The computing system of claim 2, wherein the interface is a mixed-reality environment.

6. The computing system of claim 2, wherein the interface is a proposal board for posting proposals.

7. The computing system of claim 1, wherein the one or more hardware processors are further configured for autonomously creating a new project based at least on a user-defined trigger event.

8. The computing system of claim 1, wherein the one or more hardware processors are further configured for performing geospatial timeseries tracking of contributions and assets.

9. A computer-implemented method executed on a collaborative platform for management and tracking of collaborative projects, the computer-implemented method comprising:

tracking contributions of a plurality of participants of a monitored project, wherein the contributions are formatted in a time-series contributions dataset;

gathering information from a plurality of sources including at least a competitor and investment insight service;

constructing a knowledge graph based at least on the timeseries-based contributions dataset and the information from the plurality of sources;

determining an associated value of the monitored project based at least on economic value of the monitored project by performing a plurality of graph analysis and transformations including edge analysis of the knowledge graph;

determining appropriate apportionment of remuneration based on relative contribution of the plurality of participants in the monitored project based on the plurality of graph calculations and transformations, including the edge analysis of the knowledge graph, and time-series analysis on the time-series contributions dataset; and automatically allocating remuneration in the determined apportionment.

10. The computer-implemented method of claim 9, further comprising providing a user with a plurality of interface options used for interacting with a computing system.

11. The computer-implemented method of claim 10, wherein the interface is a labor board for posting and browsing resources.

12. The computer-implemented method of claim 10, wherein the interface is a massively-multiplayer game, where a plurality of players is rewarded for solving in-game problems.

13. The computer-implemented method of claim 10, wherein the interface is a mixed-reality environment.

14. The computer-implemented method of claim 10, wherein the interface is a proposal board for posting proposals.

15. The computer-implemented method of claim 9, the computer-implemented method further comprising autonomously creating a new project based at least on a user-defined trigger event.

16. The computer-implemented method of claim 9, the computer-implemented method further comprising performing geospatial timeseries tracking of contributions and assets.

17. A system for management and tracking of collaborative projects employing a collaborative platform, comprising one or more computers with executable instructions that, when executed, cause the system to:

track contributions of a plurality of participants of a monitored project, wherein the contributions are formatted in a time-series contributions dataset;

gather information from a plurality of sources including at least a competitor and investment insight service;

construct a knowledge graph based at least on the time-series-based contributions dataset and the information from the plurality of sources;

determine an associated value of the monitored project by performing a plurality of graph analysis and transformations including edge analysis of the knowledge graph;

determine appropriate apportionment of remuneration based on relative contribution of the plurality of participants in the monitored project based on the plurality of graph calculations and transformations, including the edge analysis of the knowledge graph, and time-series analysis on the time-series contributions dataset; and predict costs, resources, labor requirements, and/or feasibility of the monitored project and/or one or more activities of the monitored project based on the plurality of graph calculations and transformations, including the edge analysis of the knowledge graph.

18. The system of claim 17, wherein the system is further caused to provide a user with an interface for interacting with the system.

19. The system of claim 18, wherein the interface is a labor board for posting and browsing resources.

20. The system of claim 18, wherein the interface is a massively multiplayer game, where a plurality of players is rewarded for solving in-game problems.

21. The system of claim 18, wherein the interface is a mixed-reality environment.

22. The system of claim 18, wherein the interface is a proposal board for posting proposals.

23. The system of claim 17, wherein the system is further caused to autonomously create a new project based at least on a user-defined trigger event.

24. The system of claim 17, wherein the system is further caused to perform geospatial timeseries tracking of contributions and assets.

25. Non-transitory, computer-readable storage media having computer instructions embodied thereon that, when executed by one or more processors of a computing system employing a collaborative platform for management and tracking of collaborative projects, cause the computing system to:

track contributions of a plurality of participants of a monitored project, wherein the contributions are formatted in a time-series contributions dataset;

gather information from a plurality of sources including at least a competitor and investment insight service;

construct a knowledge graph based on the timeseries-based contributions dataset and the information from the plurality of sources;

determine an associated value of the monitored project by performing at least a plurality of graph analysis and transformations including edge analysis of the knowledge graph;

determine appropriate apportionment of remuneration based on relative contribution of the plurality of participants in the monitored project based on the plurality of graph calculations and transformations, including the edge analysis of the knowledge graph, and time-series analysis on the time-series contributions dataset; and predict costs, resources, labor requirements, and/or feasibility of the monitored project and/or one or more activities of the monitored project based on the plurality of graph calculations and transformations, including the edge analysis of the knowledge graph.

26. The non-transitory, computer-readable storage media of claim 25, wherein the computing system is further caused to provide a user with an interface for interacting with the computing system.

27. The non-transitory, computer-readable storage media of claim 26, wherein the interface is a labor board for posting and browsing resources.

28. The non-transitory, computer-readable storage media of claim 26, wherein the interface is a massively multiplayer game, where a plurality of players is rewarded for solving in-game problems.

29. The non-transitory, computer-readable storage media of claim 26, wherein the interface is a mixed-reality environment.

30. The non-transitory, computer-readable storage media of claim 26, wherein the interface is a proposal board for posting proposals.

31. The non-transitory, computer-readable storage media of claim 25, wherein the computing system is further caused to autonomously create a new project based at least on a user-defined trigger event.

32. The non-transitory, computer-readable storage media of claim 25, wherein the computing system is further caused to perform geospatial timeseries tracking of contributions and assets.

* * * * *